(12) United States Patent
Huang

(10) Patent No.: US 11,267,125 B2
(45) Date of Patent: Mar. 8, 2022

(54) MECHANISM-PARAMETER-CALIBRATION METHOD FOR ROBOTIC ARM SYSTEM

(71) Applicant: Delta Electronics, Inc., Taoyuan (TW)

(72) Inventor: Cheng-Hao Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 135 days.

(21) Appl. No.: 16/784,801

(22) Filed: Feb. 7, 2020

(65) Prior Publication Data
US 2020/0171666 A1    Jun. 4, 2020

Related U.S. Application Data

(63) Continuation-in-part of application No. 15/917,219, filed on Mar. 9, 2018, now Pat. No. 10,596,706, (Continued)

(30) Foreign Application Priority Data

Apr. 8, 2016    (TW) .................................. 105111016

(51) Int. Cl.
*B25J 9/16*    (2006.01)
*G01B 11/00*    (2006.01)

(52) U.S. Cl.
CPC ........... *B25J 9/1692* (2013.01); *G01B 11/002* (2013.01)

(58) Field of Classification Search
CPC ................. B25J 9/1692; G01B 11/002; G05B 2219/37008; G05B 2219/39024; G05B 2219/39022
See application file for complete search history.

(56) References Cited

U.S. PATENT DOCUMENTS 6,317,699 B1    11/2001    Watanabe et al.
6,408,252 B1    6/2002    De Smet
(Continued)

FOREIGN PATENT DOCUMENTS

WO    WO2015200152 A1    12/2015

OTHER PUBLICATIONS

Office Action dated Mar. 21, 2017 in corresponding TW Application No. 105111016 (6 pages).

*Primary Examiner* — Robert T Nguyen
(74) *Attorney, Agent, or Firm* — Muncy, Geissler, Olds & Lowe, P.C.

(57) ABSTRACT

A mechanism-parametric-calibration method for a robotic arm system is provided, including: controlling the robotic arm to perform a plurality of actions so that one end of the robotic arm moves toward corresponding predictive positioning-points; determining a predictive relative-displacement between each two of the predictive positioning-points; after each of the actions is performed, sensing three-dimensional positioning information of the end of the robotic arm; determining, according to the three-dimensional positioning information, a measured relative-displacement moved by the end of the robotic arm when each two of the actions are performed; deriving an equation corresponding to the robotic arm from the predictive relative-displacements and the measured relative-displacements; and utilizing a feasible algorithm to find the solution of the equation. When an ambient temperature changes or a stress variation on the robotic arm exceeds a predetermined range, re-obtaining the set of mechanism parametric deviations corresponds to a current robot configuration.

15 Claims, 23 Drawing Sheets

Related U.S. Application Data which is a continuation-in-part of application No. 15/213,736, filed on Jul. 19, 2016, now Pat. No. 9,937,624.

(56) References Cited

U.S. PATENT DOCUMENTS

| | | | |
|---|---|---|---|
| 7,904,202 B2 * | 3/2011 | Hoppe | B25J 9/1692 |
| | | | 700/245 |
| 9,211,643 B1 | 12/2015 | Shirakyan et al. | |
| 9,360,934 B2 * | 6/2016 | Ruiz Morales | G06F 3/04842 |
| 9,937,624 B2 | 4/2018 | Huang | |
| 10,596,706 B2 * | 3/2020 | Huang | B25J 9/1674 |
| 11,088,326 B2 * | 8/2021 | Jeong | H01L 27/3246 |
| 2004/0010345 A1 | 1/2004 | Kim | |
| 2011/0280472 A1 | 11/2011 | Wallack et al. | |
| 2012/0098958 A1 | 4/2012 | Metzler et al. | |
| 2015/0158181 A1 | 6/2015 | Kawamura | |
| 2016/0059417 A1 * | 3/2016 | Shirakyan | B25J 9/1694 |
| | | | 700/251 |
| 2017/0326732 A1 | 11/2017 | Hofmann et al. | |
| 2021/0213614 A1 * | 7/2021 | Okada | B25J 19/021 |
| 2021/0250881 A1 * | 8/2021 | Lee | H04W 56/00 |

* cited by examiner

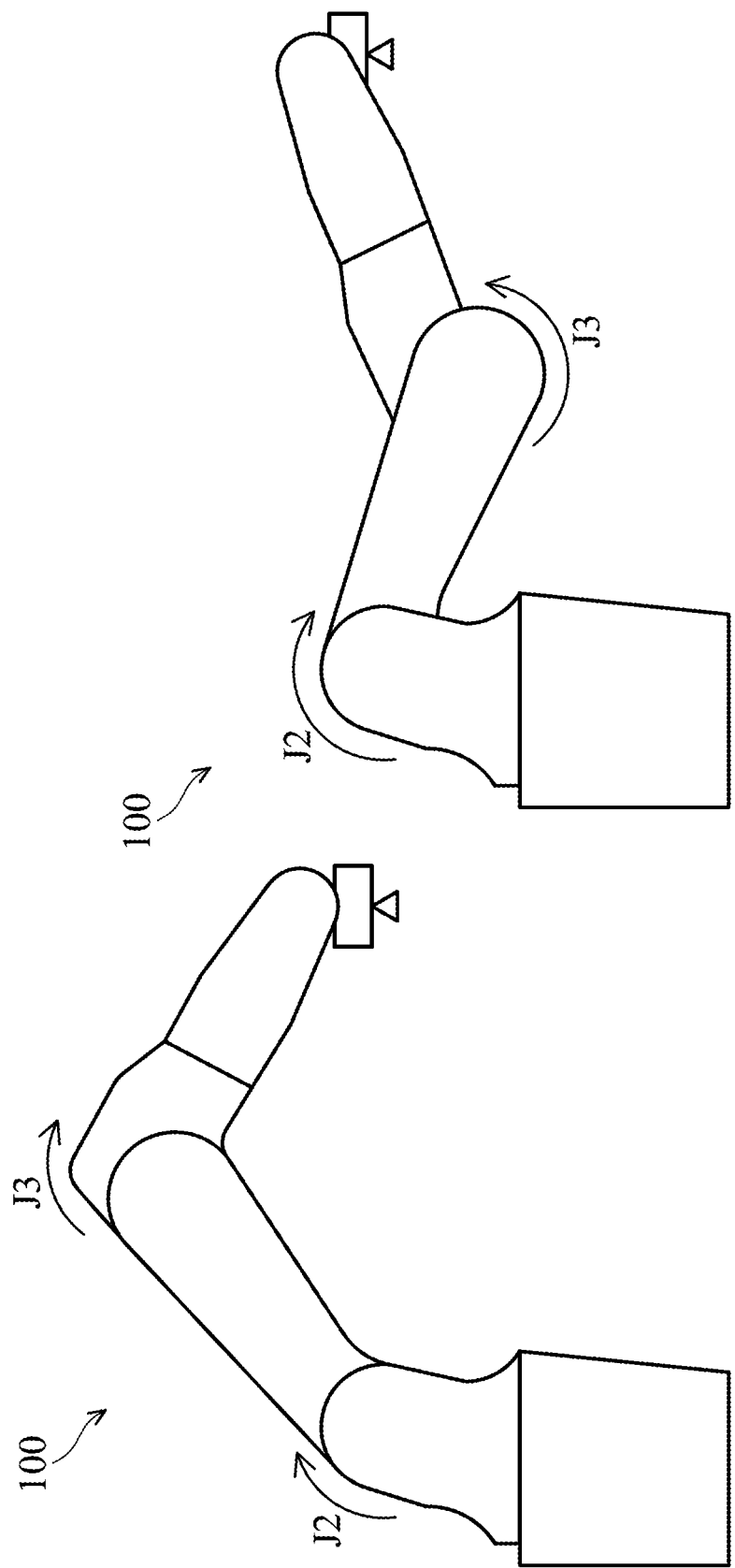

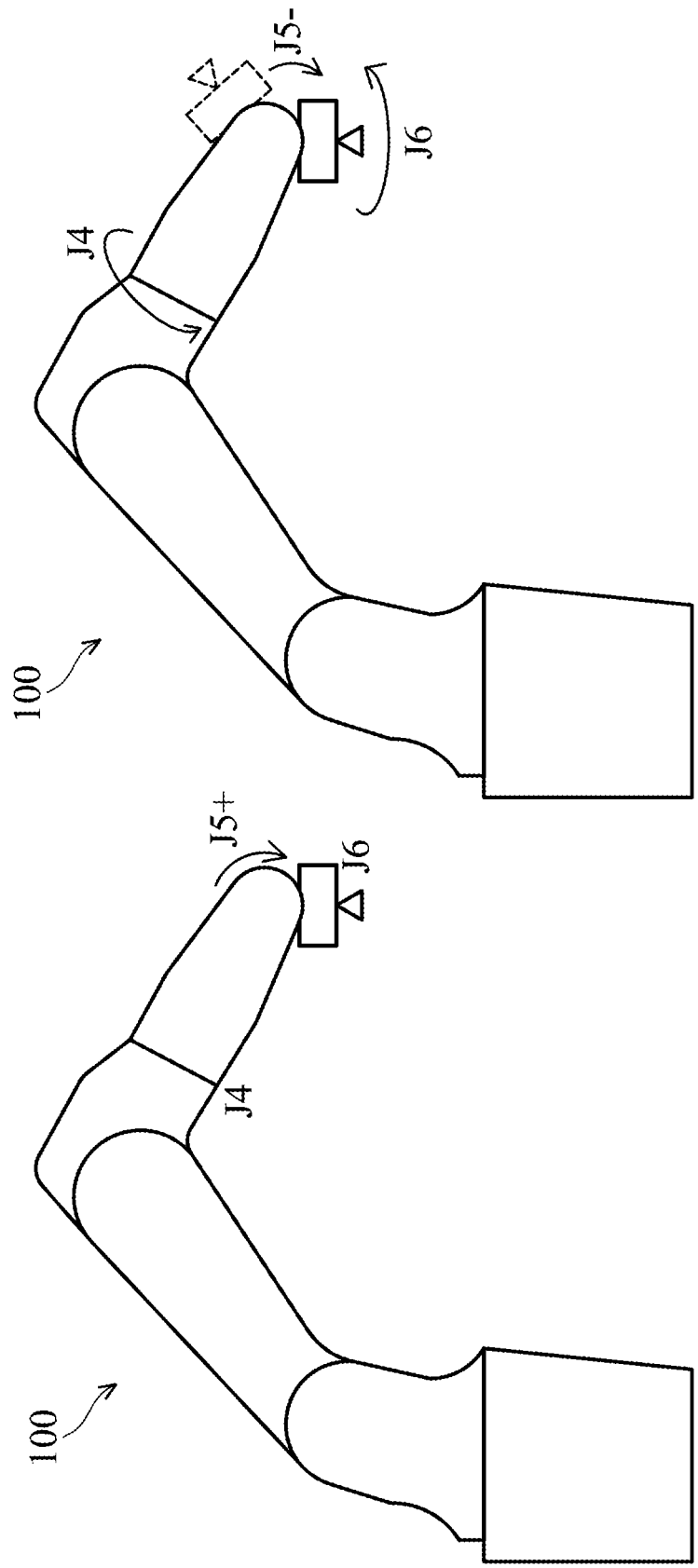

MECHANISM-PARAMETER-CALIBRATION METHOD FOR ROBOTIC ARM SYSTEM

CROSS REFERENCE TO RELATED APPLICATIONS

The present application is a continuation-in-part of and claims the priority from U.S. patent application Ser. No. 15/917,219, filed on Mar. 9, 2018, which is a continuation-in-part of and claims the priority from U.S. patent application Ser. No. 15/213,736, filed on Jul. 19, 2016, which claims the foreign priority from Taiwan Application No. TW 105111016, filed on Apr. 8, 2016, and the content of which are hereby incorporated by reference herein in the entirety.

BACKGROUND OF THE INVENTION

Field of the Invention

The disclosure relates to a robotic arm system, and more particularly to calibrating the robotic arm system by measured relative-displacement.

Description of the Related Art

The mechanical structure of a robotic arm system is quite complicated. In analysis of robot kinematics, the mechanical structure is generalized and described as a mechanism parameter set including size (arm length) of mechanical links, connection orientations and angles between joint axes, joint variables, and other geometric variables. The mechanism parameter set is further used to construct a mathematical model for calculating spatial positions of the robotic arm. In other words, according to values of the mechanism parameter set, predictive positioning-points of the robotic arm in space can be calculated by mathematical model.

Hence an ideal mathematical model of the robotic arm can be a function equation F(S) corresponding to a mechanism parameter set S for calculating predictive positioning-points P of the mathematical model of the robotic arm in space. An expression equation is shown below:

$$P=F(S)$$

Wherein the mechanism parameter set S includes the size (arm length) of mechanical links, the connection orientations and angles between joint axes, the amount of joint variables, and other geometric variables.

However, in some situations, the actual values of the mechanism parameter set S are different from the ideal values due to influence from factors such as machining tolerances of mechanical components, mechanism assembly error, mechanism transmission error, load stress variation, operation abrasion, and ambient temperature changes. Accordingly, the default values of the mechanism parameter set S tend to have errors such as position deviation ΔP between the actual measured positioning-point N and the predictive positioning-point P of the mathematical model. The position deviation ΔP represents the performance of the robotic arm in terms of positioning accuracy and efficiency, and it also reflects a margin of deviation corresponding to the mechanism parameter set S.

Deviations of every parameter in the mechanism parameter set S are supposed to be a set of mechanism parametric deviations ΔS. The set of mechanism parametric deviations ΔS and the position deviation ΔP are further assumed to have a slight deviation in their linear relationship, as shown below:

$$\Delta P = N - P \equiv J(S) \cdot \Delta S$$

Wherein the coefficient matrix $$J(S) = \frac{\partial F(S)}{\partial S}$$

is a partial differential matrix deriving from the mathematical model F(S) over the mechanism parameter set S.

FIG. 1 is a schematic diagram showing a robotic arm system 10. The robotic arm system 10 comprises a robotic arm 11, a base 12, a storage unit 13, a processing unit 14 and an absolute positioning measuring instrument 15. The robotic arm 11 is disposed on the base 12 and electrically connected to the processing unit 14. The storage unit 13 is used to store a plurality of mechanism parameter sets $S_k$, k=1, ..., n ($S_1$~$S_n$) and a corresponding plurality of predictive positioning-points $P_k$, k=1, ..., n ($P_1$~$P_n$). The predictive positioning-point $P_k$ is calculated by substituting the mechanism parameter set $S_k$ into the ideal mathematical model F(S) of the robotic arm 11, and is represented below:

$$P_k = F(S_k), k=1, \ldots, n$$

Wherein the mechanism parameter sets $S_1$~$S_n$ are the size (arm length) of mechanical links, the connection orientations and angles between joint axes, the amount of joint variables, and other geometric variables of the robotic arm 11.

The processing unit 14 comprises a calibrating calculation unit 141 and a control unit 142. The processing unit 14 is electrically connected to the storage unit 13. The control unit 142 of the processing unit 14 performs a specific action according to a specific mechanism parameter set S (e.g. $S_k$), so an end of the robotic arm 11 moves toward a predictive positioning-point P (e.g. $P_k$) corresponding to the specific mechanism parameter set S.

The absolute positioning measuring instrument 15 can be a coordinate-measuring machine (CMM) or a laser tracker. The absolute positioning measuring instrument 15 is used to perform an absolute positioning measurement on multiple positioning points of the end of the robotic arm 11 such as an end-effector. When the end of the robotic arm 11 moves toward a predictive positioning-point P (e.g. $P_k$), the absolute positioning measuring instrument 15 obtains a corresponding absolute measured positioning point N (e.g. $N_k$, k=1, ..., n).

At this moment, distinct absolute measured positioning points $N_k$ and distinct predictive positioning-points $P_k$ corresponding to n positioning points are repeatedly measured and collected to obtain a linear relationship of the predictive positioning-points $P_k$ and the mechanism parametric deviations ΔS. The linear relationship is shown below:

$$\Delta P_k = N_k - P_k \equiv J(S_k) \cdot \Delta S, k=1, 2, \ldots, n$$

According to the above linear relationship derived from enough amounts of positioning points are measured and collected, an optimization equation Φ of the robotic arm 11 is obtained and represented below:

$$\Phi = \min_{\Delta S} \sum_{k=1}^{n} (\Delta P_k - J(S_k) \cdot \Delta S)^2$$

Then the processing unit 14 of the robotic arm system 10 utilizes an optimization algorithm and the optimization equation Φ to obtain a set of mechanism parametric deviations ΔS. Finally, the processing unit 14 of the robotic arm system 10 accomplishes calibration by using the set of mechanism parametric deviations ΔS to calibrate the mechanism parameter sets $S_1 \sim S_n$ of the robotic 11.

However, the set of mechanism parametric deviations ΔS and the position deviation ΔP are assumed to have a slight deviation in their linear relationship based on approximating the position deviations of a non-linear mathematical model of the robotic arm by a partial differential equation. The approximation method is more effective for small position deviations ΔP. If the position deviations ΔP are too large, the approximation errors would reduce the efficiency of obtaining the set of mechanism parametric deviations ΔS with the optimization equation Φ. In addition, an absolute positioning measuring instrument 15 is required to serve as precision measuring equipment which can perform absolute positioning measurements. An example is the laser tracker. Absolute positioning measuring instruments 15 are expensive and are not easy to be implemented on site in factories.

In view of this, the present application provides a mechanism-parametric-calibration method, wherein calibration measurement embodiments and algorithms are illustrated to obtain a corresponding calculation result for adjusting mechanism parameters of the robotic arm. Accordingly, the accuracy of positioning the robotic arm is improved thereby.

BRIEF SUMMARY OF THE INVENTION

Accordingly, the main purpose of the present disclosure is to provide a mechanism-parametric-calibration method to improve upon the disadvantages of the prior art.

An embodiment of the present disclosure provides a mechanism-parametric-calibration method for a robotic arm system. The robotic arm system comprises a robotic arm and a measuring instrument. The mechanism-parametric-calibration method comprises controlling, according to n mechanism parameter sets, the robotic arm performing n actions so that the end of the robotic arm moves toward n corresponding predictive positioning-points; determining a predictive relative-displacement equation of each two of the n predictive positioning-points; sensing, using the measuring instrument, three-dimensional measured positioning-points corresponding to the end of the robotic arm after the robotic arm performs each of the n actions; determining, according to the n three-dimensional measured positioning-points, a measured relative-displacement moved by the end of the robotic arm when the robotic arm performs each two of the n actions; deriving an optimization equation corresponding to the robotic arm from the predictive relative-displacement equations and the measured relative-displacements; obtaining, by the optimization equation, a set of mechanism parametric deviations of the robotic arm; and calibrating, by the set of mechanism parametric deviations, the n mechanism parameter sets of the robotic arm. Wherein the optimization equation is $$\Phi = \min_{\Delta S} \sum_{i=1}^{n-1} \sum_{j=i+1}^{n} (\Delta M_{i,j} - G(S_i, S_j, \Delta S(rConfig)))^2$$

Wherein $\Delta M_{i,j}$ is the measured relative-displacement, $G(S_i, S_j, \Delta S(rConfig))$ is the predictive relative-displacement equation, $S_i$ and $S_j$ are the mechanism parameter sets, and $\Delta S(rConfig)$ is the set of mechanism parametric deviations related to a specific status of the robotic arm. When an ambient temperature of the robotic arm changes or a stress variation on the robotic arm exceeds a predetermined range, re-obtaining the set of mechanism parametric deviations corresponds to a current robot configuration of the robotic arm by the optimization equation.

An embodiment of the present disclosure provides a mechanism-parametric-calibration method for a robotic arm system. The robotic arm system comprises a robotic arm, a calibration block and a measuring instrument. The mechanism-parametric-calibration method comprises controlling, according to nx mechanism parameter sets corresponding to nx first-direction predictive positioning-points, the robotic arm performing nx actions so that the end of the robotic arm moves toward the nx first-direction predictive positioning-points which are in front of a first precision plane of the calibration block; sensing, using the measuring instrument, a first-direction measured displacement between the first precision plane and the end of the robotic arm when the robotic arm performs each of the nx actions; determining, according to the nx first-direction measured displacement, a first-direction measured relative-displacement moved by the end of the robotic arm when the robotic arm performs each two of the nx actions; determining a first-direction predictive relative-displacement equation of each two of the nx first-direction predictive positioning-points; deriving an optimization equation corresponding to the robotic arm from the first-direction predictive relative-displacement equations and the first-direction measured relative-displacements; obtaining, by the optimization equation, a set of mechanism parametric deviations of the robotic arm; and calibrating, by the set of mechanism parametric deviations, the nx mechanism parameter sets corresponding to the nx first-direction predictive positioning-points of the robotic arm. When an ambient temperature of the robotic arm changes or a stress variation on the robotic arm exceeds a predetermined range, re-obtaining the set of mechanism parametric deviations corresponds to a current robot configuration of the robotic arm by the optimization equation.

BRIEF DESCRIPTION OF THE DRAWINGS

The present disclosure can be more fully understood by reading the subsequent detailed description and examples with references made to the accompanying drawings, wherein:

FIGS. 10A-10F are schematic diagrams of different operating configurations of a general 6-Axis vertical articulated arm according to some embodiments of the present invention.

DETAILED DESCRIPTION OF THE INVENTION

Figure 2:
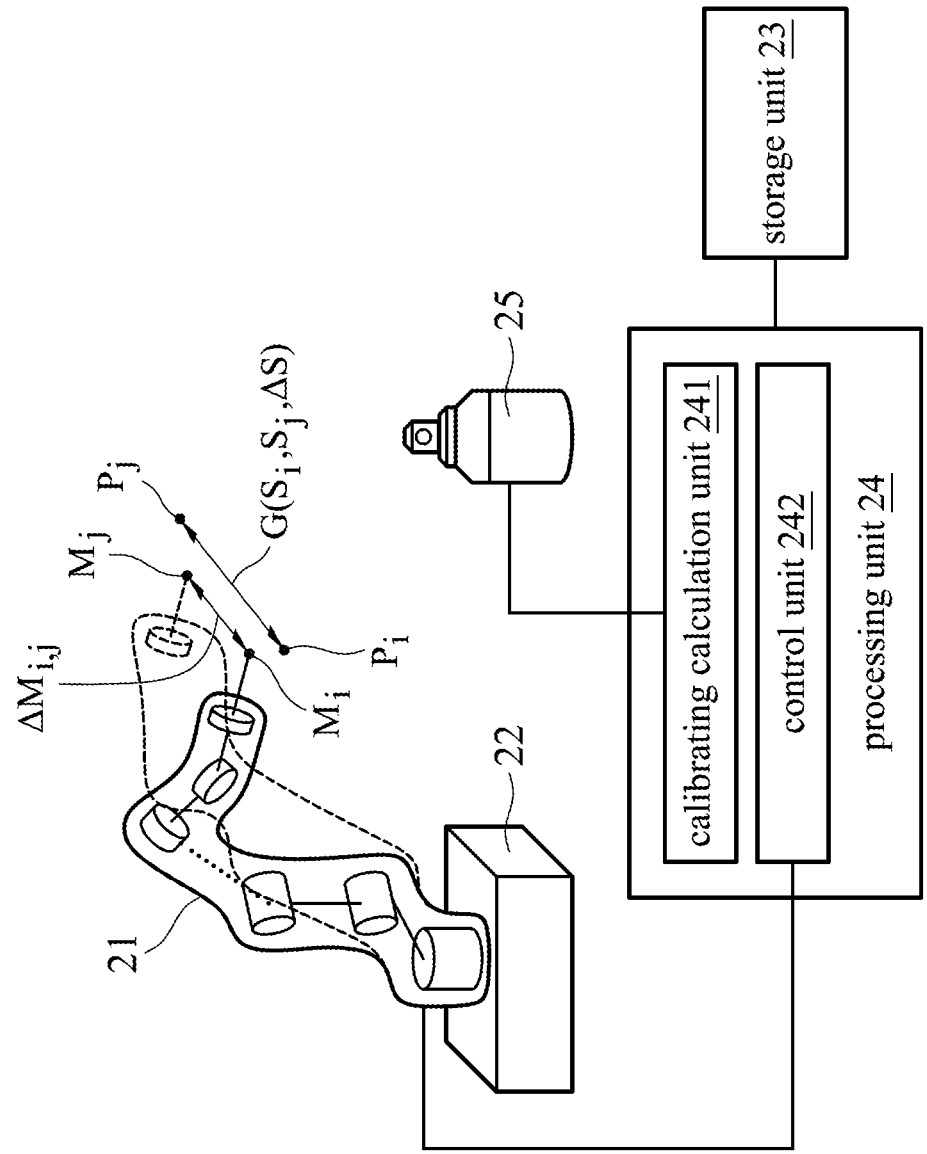
FIG. 2 is a system configuration diagram of a robotic arm system 20 according to an embodiment of the present disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims Terms used in this disclosure:

P~predictive positioning-point of the mathematical model
S~mechanism parameter set
N~absolute measured positioning-point
$\Delta P$~position deviation
$\Delta S$~set of mechanism parametric deviations
$P_k$, k=1, . . . , n~predictive positioning-points
$S_k$, k=1, . . . , n~mechanism parameter sets corresponding to the predictive positioning-points
$\Delta P_{i,j}$, i=1, . . . , n−1, j=i+1, . . . , n~predictive relative-displacement
$M_k$, k=1, . . . , n~three-dimensional measured positioning-point
$\Delta M_{i,j}$, i=1, . . . , n−1, j=i+1, . . . , n~measured relative-displacement
$G(S_i, S_j, \Delta S)$~predictive relative-displacement equation
$g_x(S_i, S_j, \Delta S)$~first-direction predictive relative-displacement equation
$g_y(S_i, S_j, \Delta S)$~second-direction predictive relative-displacement equation
$g_z(S_i, S_j, \Delta S)$~third-direction predictive relative-displacement
$xS_k$, k=1, . . . , nx~mechanism parameter sets corresponding to the first-direction predictive positioning-points
$yS_k$, k=1, . . . , ny~mechanism parameter sets corresponding to the second-direction predictive positioning-points
$zS_k$, k=1, . . . , nz~mechanism parameter sets corresponding to the third-direction predictive positioning-points
$xP_k$, k=1, . . . , nx~first-direction predictive positioning-points
$yP_k$, k=1, . . . , ny~second-direction predictive positioning-points
$zP_k$, k=1, . . . , nz~third-direction predictive positioning-points
$\Delta xP_{i,j}$, i=1, . . . , nx−1, j=i+1, . . . , nx~first-direction predictive relative-displacement
$\Delta yP_{i,j}$, i=1, . . . , ny−1, j=i+1, y−1, ~second-direction predictive relative-displacement
$\Delta zP_{i,j}$, i=1, . . . , nz−1, j=i+1, z−1, ~third-direction predictive relative-displacement
$G(xS_i, xS_j, \Delta S)$~three-dimensional predictive relative displacement equation corresponding to the first-direction predictive positioning-points
$g_x(xS_i, xS_j, \Delta S)$~first-direction predictive relative-displacement equations corresponding to the first-direction predictive positioning-points
$g_y(xS_i, xS_j, \Delta S)$~second direction predictive relative-displacement equations corresponding to the first-direction predictive positioning-points
$g_z(xS_i, xS_j, \Delta S)$~third direction predictive relative-displacement equations corresponding to the first-direction predictive positioning-points
$G(yS_i, yS_j, \Delta S)$~three-dimensional predictive relative-displacement equation corresponding to the second-direction predictive positioning-points
$g_x(yS_i, yS_j, \Delta S)$~first-direction predictive relative-displacement equations corresponding to the second-direction predictive positioning-points
$g_y(yS_i, yS_j, \Delta S)$~second-direction predictive relative-displacement equations corresponding to the second-direction predictive positioning-points
$g_z(yS_i, yS_j, \Delta S)$~third-direction predictive relative-displacement equations corresponding to the second-direction predictive positioning-points
$G(zS_i, zS_j, \Delta S)$~three-dimensional predictive relative-displacement equation corresponding to the third-direction predictive positioning-points
$g_x(zS_i, zS_j, \Delta S)$~first-direction predictive relative-displacement equations corresponding to the third-direction predictive positioning-points
$g_y(zS_i, zS_j, \Delta S)$~second-direction predictive relative-displacement equations corresponding to the third-direction predictive positioning-points
$g_z(zS_i, zS_j, \Delta S)$~third-direction predictive relative-displacement equations corresponding to the third-direction predictive positioning-points
$\Delta xMx_{i,j}$, i=1, . . . , nx−1, j=i+1, . . . , nx~first-direction measured relative-displacement corresponding to the first-direction predictive positioning-points $xP_i$ and $xP_j$
$\Delta yMy_{i,j}$, i=1, . . . , ny−1, j=i+1, . . . , ny~second-direction measured relative-displacements corresponding to the second-direction predictive positioning-points $yP_i$ and $yP_j$
$\Delta zMz_{i,j}$, i=1, . . . , nz−1, j=i+1, . . . , nz~third-direction measured relative-displacements corresponding to the second-direction predictive positioning-points $zP_i$ and $zP_j$
$xMx_k$, k=1, . . . , nx~first-direction measured displacement
$yMy_k$, k=1, . . . , ny~second-direction measured displacement
$zMz_k$, k=1, . . . , nz~third-direction measured displacement Dx, Dy, Dz~first-direction displacement parameter, second-direction displacement parameter, third-direction displacement parameter FIG. 2 is a system configuration diagram of a robotic arm system 20 according to an embodiment of the present disclosure. In FIG. 2, the robotic arm system 20 comprises a robotic arm 21, a base 22, a storage unit 23, a processing unit 24 and a measuring instrument 25. The robotic arm 21 is disposed on the base 22 and electrically connected to the processing unit 24.

In FIG. 2, assuming a calibrated mathematical model of the robotic arm 21 is represented below:

$$P = F(S + \Delta S)$$

Wherein the mechanism parameter set S is, but not limited thereto, a set of the size (arm length) of mechanical links, the connection orientations and angles between joint axes, the amount of joint variables, and other geometric variables of the robotic arm 21, and the set of mechanism parametric deviations ΔS is prepared for compensating for the mechanism parameter set S after calibration.

In FIG. 2, the storage unit 23 is used to store a plurality of mechanism parameter sets $S_k$, k=1, . . . , n ($S_1 \sim S_n$). Corresponding predictive positioning-points $P_k$, k=1, . . . , n ($P_1 \sim P_n$) are obtained by substituting the mechanism parameter set $S_k$ into the calibrated mathematical model F(S+ΔS) of the robotic arm 21 and can be represented below:

$$P_k = F(S_k + \Delta S), k=1, \ldots, n$$

Wherein the mechanism parameter sets $S_1 \sim S_n$ comprise the size (arm length) of mechanical links, the connection orientations and angles between joint axes, the amount of joint variables, and other geometric variables.

In FIG. 2, the processing unit 24 comprises a calibrating calculation unit 241 and a control unit 242. The processing unit 24 is electrically connected to the storage unit 23. The control unit 242 of the processing unit 24 controls the robotic arm 21 performing a plurality of actions so that an end of the robotic arm 21 moves toward corresponding predictive positioning-points $P_1 \sim P_n$. E.g. the control unit 242 of the processing unit 24 performs an action according to a specific mechanism parameter set $S_k$ so the end of the robotic arm 21 moves toward a specific corresponding predictive positioning-point $P_k$. In FIG. 2, the calibrating calculation unit 241 of the processing unit 24 further determines a predictive relative-displacement $\Delta P_{i,j}$ which is between each two of the predictive positioning-points $P_1 \sim P_n$.

In FIG. 2, the two predictive positioning-points $P_i$ and $P_j$ are respectively represented as $P_i = F(S_i + \Delta S)$ and $P_j = F(S_j + \Delta S)$, and a predictive relative-displacement equation $G(S_i, S_j, \Delta S)$ between the two predictive positioning-points $P_i$ and $P_j$ is represented below:

$$\begin{aligned}\Delta P_{i,j} &= P_j - P_i \\ &= F(S_j + \Delta S) - F(S_i + \Delta S) \\ &= G(S_i, S_j, \Delta S), i=1, \ldots, n-1, j=i+1, \ldots, n\end{aligned}$$

In FIG. 2, the measuring instrument 25 is electrically connected to the processing unit 24. The measuring instrument 25 is used to measure three-dimensional positioning information corresponding to the end of the robotic arm 21 while the robotic arm 21 performing each of the actions. The calibrating calculation unit 241 of the processing unit 24 determines, according to the three-dimensional positioning information, a measured relative-displacement $\Delta M_{i,j}$ moved by the end of the robotic arm 21 while performing each two of the actions. Then the calibrating calculation unit 241 of the processing unit 24 obtains an optimization equation Φ corresponding to the robotic arm 21 according to the predictive relative-displacement equations $G(S_i, S_j, \Delta S)$ and the measured relative-displacements $\Delta M_{i,j}$.

In FIG. 2, the measuring instrument 25 measures three-dimensional measured positioning-points $M_k$, k=1, . . . , n ($M_1 \sim M_n$) corresponding to the end of the robotic arm 21 while the robotic arm 21 performing each of the actions. The calibrating calculation unit 241 of the processing unit 24 determines the measured relative-displacement $\Delta M_{i,j}$ between each two of the three-dimensional measured positioning-points $M_1 \sim M_n$. In FIG. 2, the measured relative-displacement $\Delta M_{i,j}$ corresponding to two predictive positioning-points $P_i$ and $P_j$ is represented below:

$$\Delta M_{i,j} = M_j - M_i, i=1, \ldots, n-1, j=i+1, \ldots, n$$

That is, the three-dimensional positioning information includes the three-dimensional measured positioning-points $M_1 \sim M_n$ and the measured relative-displacements $\Delta M_{i,j}$.

In FIG. 2, the measuring instrument 25 can be a coordinate-measuring machine or a laser tracker which performs spatial positioning measurement. Because the processing unit 24 only requires the measured relative-displacement $\Delta M_{i,j}$ corresponding to two predictive positioning-points $P_i$ and $P_j$, the choices of the measuring instrument 25 are not limited to an absolute positioning measuring instrument. The measuring instrument 25 can also be a contact instrument or a non-contact instrument which performs spatial positioning measurements.

Then the calibrating calculation unit 241 of the processing unit 24 calculates the optimization equation Φ corresponding to the robotic arm 21 according to the predictive relative-displacement equations $G(S_i, S_j, \Delta S)$ and the measured relative-displacements $\Delta M_{i,j}$, and the optimization equation Φ0 is represented below:

$$\Phi = \min_{\Delta S} \sum_{i=1}^{n-1} \sum_{j=i+1}^{n} (\Delta M_{i,j} - G(S_i, S_j, \Delta S))^2$$

Then the processing unit 24 of the robotic arm system 20 utilizes an optimization algorithm and the optimization equation Φ to obtain a set of mechanism parametric deviations ΔS. Finally, the processing unit 24 of the robotic arm system 20 uses the set of mechanism parametric deviations ΔS to calibrate the mechanism parameter sets $S_1 \sim S_n$ of the robotic arm 21.

It should be noted that, among the choices of the optimization algorithm of the robotic arm system 20, the processing unit 24 can be adopted an optimization algorithm with a non-linear equation. Because the predictive relative-displacement equation $G(S_i, S_j, \Delta S)$ used for calculating the predictive relative-displacement $\Delta P_{i,j}$ of the robotic arm 21 is almost equivalent to the robot non-linear mathematical model, the approximation error of the predictive relative-displacement equation $G(S_i, S_j, \Delta S)$ is extremely small. Accordingly, the optimization convergence effect of the set of mechanism parametric deviations ΔS obtained by the optimization equation Φ of the robotic arm system 20 is greater than the optimization convergence effect of the set of mechanism parametric deviations ΔS obtained by the optimization equation Φ of the robotic arm system 10.

Figure 3:
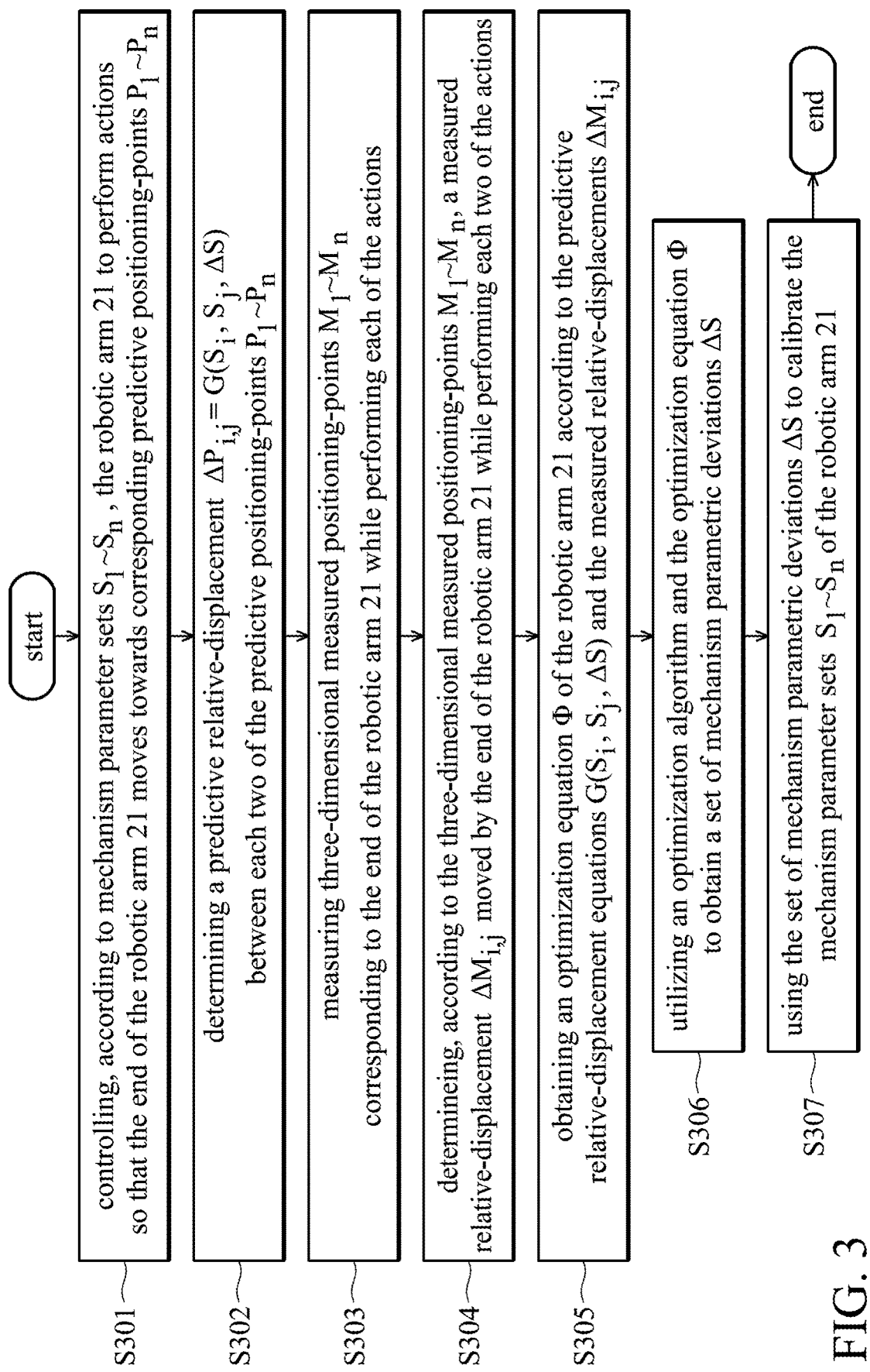
FIG. 3 shows a flow diagram illustrating a mechanism-parametric-calibration method for the robotic arm system 20.

FIG. 3 shows a flow diagram illustrating a mechanism-parametric-calibration method for the robotic arm system 20. In step S301, the processing unit 24 of the robotic arm system 20 controls, according to a plurality of mechanism parameter sets $S_k$, k=1, . . . , n ($S_1$~$S_n$), the robotic arm 21 to perform a plurality of actions so that the end of the robotic arm 21 moves toward a plurality of corresponding predictive positioning-points $P_1$~$P_n$. In step S302, the processing unit 24 of the robotic arm system 20 determines a predictive relative-displacement $\Delta P_{i,j}$=G($S_i$, $S_j$, $\Delta S$) between each two of the predictive positioning-points $P_1$~$P_n$. In step S303, the measuring instrument 25 measures three-dimensional measured positioning-points $M_k$, k=1, . . . , n ($M_1$~$M_n$) corresponding to the end of the robotic arm 21 while the robotic arm 21 performing each of the actions. In step S304, the processing unit 24 of the robotic arm system 20 determines, according to the three-dimensional measured positioning-points $M_1$~$M_n$, a measured relative-displacement $\Delta M_{i,j}$ moved by the end of the robotic arm 21 while the robotic arm 21 performing each two of the actions. In step S305, the processing unit 24 of the robotic arm system 20 obtains an optimization equation $\Phi$ corresponding to the robotic arm 21 according to the predictive relative-displacement equations G($S_i$, $S_j$, $\Delta S$) and the measured relative-displacements $\Delta M_{i,j}$. In step S306, the processing unit 24 of the robotic arm system 20 utilizes an optimization algorithm and the optimization equation $\Phi$ to obtain a set of mechanism parametric deviations $\Delta S$. In step S307, the processing unit 24 of the robotic arm system 20 uses the set of mechanism parametric deviations $\Delta S$ to calibrate the mechanism parameter sets $S_1$~$S_n$ of the robotic arm 21.

Figure 4:
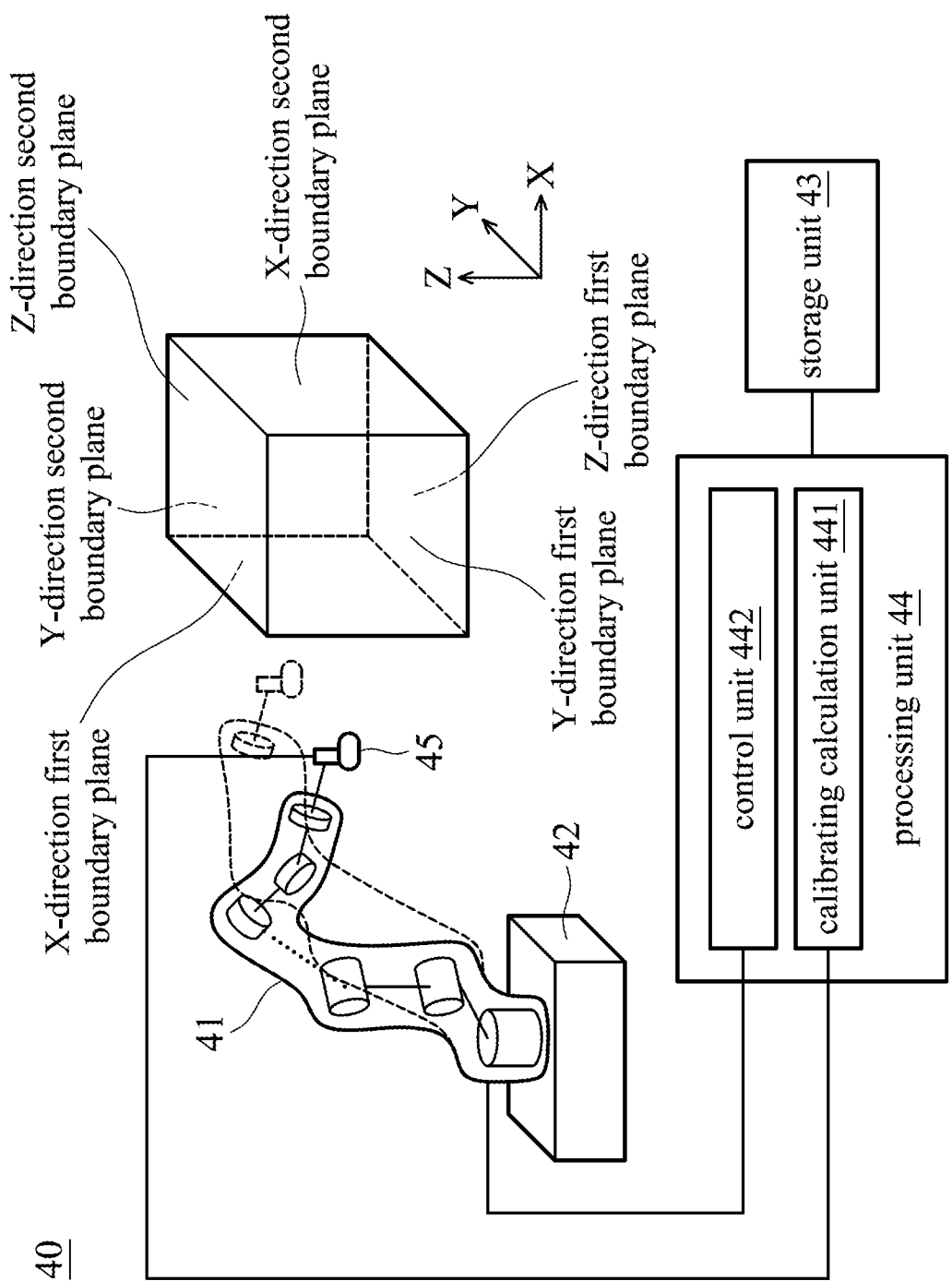
FIG. 4 is a system configuration diagram of a robotic arm system 40 according to an embodiment of the present disclosure.

FIG. 4 is a system configuration diagram of a robotic arm system 40 according to an embodiment of the present disclosure. In FIG. 4, the robotic arm system 40 comprises a robotic arm 41, a base 42, a storage unit 43, a processing unit 44 and a measuring instrument 45. The robotic arm 41 is disposed on the base 42 and electrically connected to the processing unit 44. The processing unit 44 is electrically connected to the storage unit 43 and the measuring instrument 45. The storage unit 43 is used to store nx mechanism parameter sets $xS_1$~$xS_{nx}$ corresponding to the first-direction predictive positioning-points $xP_k$, k=1, . . . , nx, ny mechanism parameter sets $yS_1$~$yS_{ny}$ corresponding to the second-direction predictive positioning-points $yP_k$, k=1, . . . , ny, and nz mechanism parameter sets $zS_1$~$zS_{nz}$ corresponding to the third-direction predictive positioning-points $zP_k$, k=1, . . . , nz of the robotic arm 41. The processing unit 44 comprises a calibrating calculation unit 441 and a control unit 442.

In FIG. 4, the nx mechanism parameter sets $xS_1$~$xS_{nx}$, the ny mechanism parameter sets $yS_1$~$yS_{ny}$ and the nz mechanism parameter sets $zS_1$~$zS_{nz}$ also comprise the size (arm length) of mechanical links, the connection orientations and angles between joint axes, the amount of joint variables, and other geometric variables.

In FIG. 4, the robotic arm system 40 obtains a set of mechanism parametric deviations $\Delta S$ through multiple calibration boundary planes. As shown in FIG. 4, the multiple calibration boundary planes comprise an X-direction first boundary plane, an X-direction second boundary plane, a Y-direction first boundary plane, a Y-direction second boundary plane, a Z-direction first boundary plane and a Z-direction second boundary plane.

In FIG. 4, the measuring instrument 45 is disposed on one end of the robotic arm 41, and the measuring instrument 45 can be a probe, a dial gauge, or a laser displacement meter which performs one-dimensional displacement measurement, or it can be a contact instrument or a non-contact instrument which performs displacement measurement. The present disclosure is not limited thereto. In another embodiment of the present disclosure, the measuring instrument 45 is not disposed on the end of the robotic arm 41, but is disposed in the configuration of the measuring instrument 25 shown in FIG. 2. At this moment, the measuring instrument 45 can be a coordinate-measuring machine or a laser tracker which performs spatial positioning measurement.

In FIG. 4, the measuring instrument 45 of the robotic arm system 40 utilizes the X-direction first boundary plane and the X-direction second boundary plane to measure first-direction measured relative-displacements $\Delta xMx_{i,j}$, i=1, . . . , nx–1, j=i+1, . . . , nx corresponding to the first-direction predictive positioning-points $xP_k$, k=1, . . . , nx. The processing unit 44 of the robotic arm system 40 calculates a three-dimensional predictive relative-displacement equation G($xS_i$, $xS_j$, $\Delta S$) corresponding to two first-direction predictive positioning-points $xP_i$ and $xP_j$. The three-dimensional predictive relative-displacement equation G($xS_i$, $xS_j$, $\Delta S$) is shown below:

$$\Delta xP_{i,j} \equiv G(xS_i, xS_j, \Delta S) = \begin{bmatrix} g_x(xS_i, xS_j, \Delta S) \\ g_y(xS_i, xS_j, \Delta S) \\ g_z(xS_i, xS_j, \Delta S) \end{bmatrix},$$

$$i = 1, \ldots, nx-1, j = i+1, \ldots, nx$$

Wherein $g_x(xS_i, xS_j, \Delta S)$, $g_y(xS_i, xS_j, \Delta S)$ and $g_z(xS_i, xS_j, \Delta S)$ are respectively a first-direction predictive relative-displacement equation, a second-direction predictive relative-displacement equation, and a third-direction predictive relative-displacement equation corresponding to the two first-direction predictive positioning-points $xP_i$ and $xP_j$.

In FIG. 4, the measuring instrument 45 of the robotic arm system 40 utilizes the Y-direction first boundary plane and the Y-direction second boundary plane to measure second-direction measured relative-displacements $\Delta yMy_{i,j}$, i=1, . . . , ny–1, j=i+1, . . . , ny corresponding to the second-direction predictive positioning-points $yP_k$, k=1, . . . , ny. The processing unit 44 of the robotic arm system 40 calculates a three-dimensional predictive relative-displacement equation G($yS_i$, $yS_j$, $\Delta S$) corresponding to two second-direction predictive positioning-points $yP_i$ and $yP_j$. The three-dimensional predictive relative-displacement equation G($yS_i$, $yS_j$, $\Delta S$) is shown below:

$$\Delta yP_{i,j} \equiv G(yS_i, yS_j, \Delta S) = \begin{bmatrix} g_x(yS_i, yS_j, \Delta S) \\ g_y(yS_i, yS_j, \Delta S) \\ g_z(yS_i, yS_j, \Delta S) \end{bmatrix},$$

$$i = 1, \ldots, ny-1, j = i+1, \ldots, ny$$

Wherein $g_x(yS_i, yS_j, \Delta S)$, $g_y(yS_i, yS_j, \Delta S)$ and $g_z(yS_i, yS_j, \Delta S)$ are respectively a first-direction predictive relative-displacement equation, a second-direction predictive relative-displacement equation, and a third-direction predictive relative-displacement equation corresponding to the two second-direction predictive positioning-points $yP_i$ and $yP_j$.

In FIG. 4, the measuring instrument 45 of the robotic arm system 40 utilizes the Z-direction first boundary plane and the Z-direction second boundary plane to measure third-direction measured relative-displacements $\Delta zMz_{i,j}$, i=1, . . . , ny–1, j=i+1, . . . , nz corresponding to the third-direction predictive positioning-points $zP_k$, k=1, ..., nz. The processing unit 44 of the robotic arm system 40 calculates a three-dimensional predictive relative-displacement equation $G(zS_i, zS_j, \Delta S)$ corresponding to two third-direction predictive positioning-points $zP_i$ and $zp_j$. The three-dimensional predictive relative-displacement equation $G(zS_i, zS_j, \Delta S)$ is shown below:

$$\Delta zP_{i,j} \equiv G(zS_i, zS_j, \Delta S) = \begin{bmatrix} g_x(zS_i, zS_j, \Delta S) \\ g_y(zS_i, zS_j, \Delta S) \\ g_z(zS_i, zS_j, \Delta S) \end{bmatrix},$$

$$i = 1, \ldots, nz-1, j = i+1, \ldots, nz$$

Wherein $g_x(zS_i, zS_j, \Delta S)$, $g_y(zS_i, zS_j, \Delta S)$ and $g_z(zS_i, zS_j, \Delta S)$ are respectively a first-direction predictive relative-displacement equation, a second-direction predictive relative-displacement equation, and a third-direction predictive relative-displacement equation corresponding to the two third-direction predictive positioning-points $zP_i$ and $zP_j$.

In FIG. 4, the calibrating calculation unit 441 of the processing unit 44 calculates an optimization equation $\Phi$ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points, the second-direction predictive relative-displacement equation $g_y(yS_i, yS_j, \Delta S)$ and the second-direction measured relative-displacements $\Delta yMy_{i,j}$ corresponding to the second-direction predictive positioning-points, and the third-direction predictive relative-displacement equation $g_z(zS_i, zS_j, \Delta S)$ and the third-direction measured relative-displacements $\Delta zMz_{i,j}$ corresponding to the third-direction predictive positioning-points. The optimization equation $\Phi$ is represented below:

$$\Phi = \min_{\Delta S} \left\{ \sum_{i=1}^{nx-1} \sum_{j=i+1}^{nx} (\Delta xMx_{i,j} - g_x(xS_i, xS_j, \Delta S))^2 + \right.$$

$$\sum_{i=1}^{ny-1} \sum_{j=i+1}^{ny} (\Delta yMy_{i,j} - g_y(yS_i, yS_j, \Delta S))^2 +$$

$$\left. \sum_{i=1}^{nz-1} \sum_{j=i+1}^{nz} (\Delta zMz_{i,j} - g_z(zS_i, zS_j, \Delta S))^2 \right\}$$

Then the processing unit 44 of the robotic arm system 40 utilizes an optimization algorithm and the optimization equation $\Phi$ to obtain a set of optimal mechanism parametric deviations $\Delta S$. Finally, the processing unit 44 of the robotic arm system 40 uses the set of optimal mechanism parametric deviations $\Delta S$ to calibrate the mechanism parameter sets $xS_1 \sim xS_{nx}$ corresponding to the first-direction predictive positioning-points $xP_1 \sim xP_{nx}$, the mechanism parameter sets $yS_1 \sim yS_{ny}$ corresponding to the second-direction predictive positioning-points $yP_1 \sim yP_{ny}$, and the mechanism parameter sets $zS_1 \sim zS_{nz}$ corresponding to the third-direction predictive positioning-points $zP_1 \sim zP_{nz}$ of the robotic arm 41.

In another embodiment of the present disclosure, the robotic arm system 40 performs only one-dimensional measurement and calculation and obtains a corresponding optimization equation $\Phi$. The one dimension comprises the X-direction, Y-direction or Z-direction. E.g. the robotic arm system 40 only performs X-direction measurement and calculation. In this case, the calibrating calculation unit 441 of the processing unit 44 calculates the optimization equation $\Phi$ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points. The optimization equation $\Phi$ is represented below:

$$\Phi = \min_{\Delta S} \left\{ \sum_{i=1}^{nx-1} \sum_{j=i+1}^{nx} (\Delta xMx_{i,j} - g_x(xS_i, xS_j, \Delta S))^2 \right\}$$

In this case, the processing unit 44 of the robotic arm system 40 also utilizes an optimization algorithm and the optimization equation $\Phi$ of X-direction to obtain a set of optimal mechanism parametric deviations $\Delta S$. Finally, the processing unit 44 of the robotic arm system 40 uses the set of optimal mechanism parametric deviations $\Delta S$ to calibrate the mechanism parameter sets $xS_1 \sim xS_{nx}$ corresponding to the first-direction predictive positioning-points $xP_1 \sim xP_{nx}$ of the robotic arm 41.

In another embodiment of the present disclosure, the robotic arm system 40 performs measurement and calculation in only two dimensions and obtains a corresponding optimization equation $\Phi$. The two dimensions may comprise the X-direction and Y-direction, the Y-direction and Z-direction, or the X-direction and Z-direction. E.g. the robotic arm system 40 performs measurement and calculation in only first and second directions (the X-direction and Y-direction). In this case, the calibrating calculation unit 441 of the processing unit 44 calculates an optimization equation $\Phi$ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points and the second-direction predictive relative-displacement equation $g_y(yS_j, yS_j, \Delta S)$ and the second-direction measured relative-displacements $\Delta yMy_{i,j}$ corresponding to the second-direction predictive positioning-points. The optimization equation $\Phi$ is represented below:

$$\Phi = \min_{\Delta S} \left\{ \sum_{i=1}^{nx-1} \sum_{j=i+1}^{nx} (\Delta xMx_{i,j} - g_x(xS_i, xS_j, \Delta S))^2 + \right.$$

$$\left. \sum_{i=1}^{ny-1} \sum_{j=i+1}^{ny} (\Delta yMy_{i,j} - g_y(yS_i, yS_j, \Delta S))^2 \right\}$$

In this case, the processing unit 44 of the robotic arm system 40 also utilizes an optimization algorithm and the optimization equation $\Phi$ of X-direction and Y-direction to obtain a set of optimal mechanism parametric deviations $\Delta S$. Finally, the processing unit 44 of the robotic arm system 40 uses the set of optimal mechanism parametric deviations $\Delta S$ to calibrate the mechanism parameter sets $xS_1 \sim xS_{nx}$ corresponding to the first-direction predictive positioning-points $xP_1 \sim xP_{nx}$ and the mechanism parameter sets $yS_1 \sim yS_{ny}$ corresponding to the second-direction predictive positioning-points $yP_1 \sim yP_{ny}$ of the robotic arm 41.

It should be noted that, in the choices of the optimization algorithm of the robotic arm system 40, the processing unit 44 adopts the optimization algorithm with a non-linear equation. Because the first-direction predictive relative-displacement equations $g_x(xS_i, xS_j, \Delta S)$, the second-direction predictive relative-displacement equation $g_y(yS_i, yS_j, \Delta S)$ and the third-direction predictive relative-displacement equation $g_z(zS_i, zS_j, \Delta S)$ used for calculating the robotic arm 41 are almost equivalent to the robot non-linear mathematical model, approximation errors of $g_x(xS_i, xS_j, \Delta S)$, $g_y(yS_i, yS_j, \Delta S)$ and $g_z(zS_i, zS_j, \Delta S)$ are extremely small. Accordingly, the optimization convergence effect of the set of mechanism parametric deviations $\Delta S$ obtained by the optimization equation $\Phi$ of the robotic arm system 40 is greater than the optimization convergence effect of the set of mechanism parametric deviations $\Delta S$ obtained by the optimization equation $\Phi$ of the robotic arm system 10.

Finally, it should be noted that the optimization algorithm utilized in the robotic arm system 20 and the robotic arm system 40 comprises the Least-Squares method, Gradient-Descent method, Gauss-Newton method or Levenberg-Marquardt method, but the present disclosure is not limited thereto.

Figure 5:
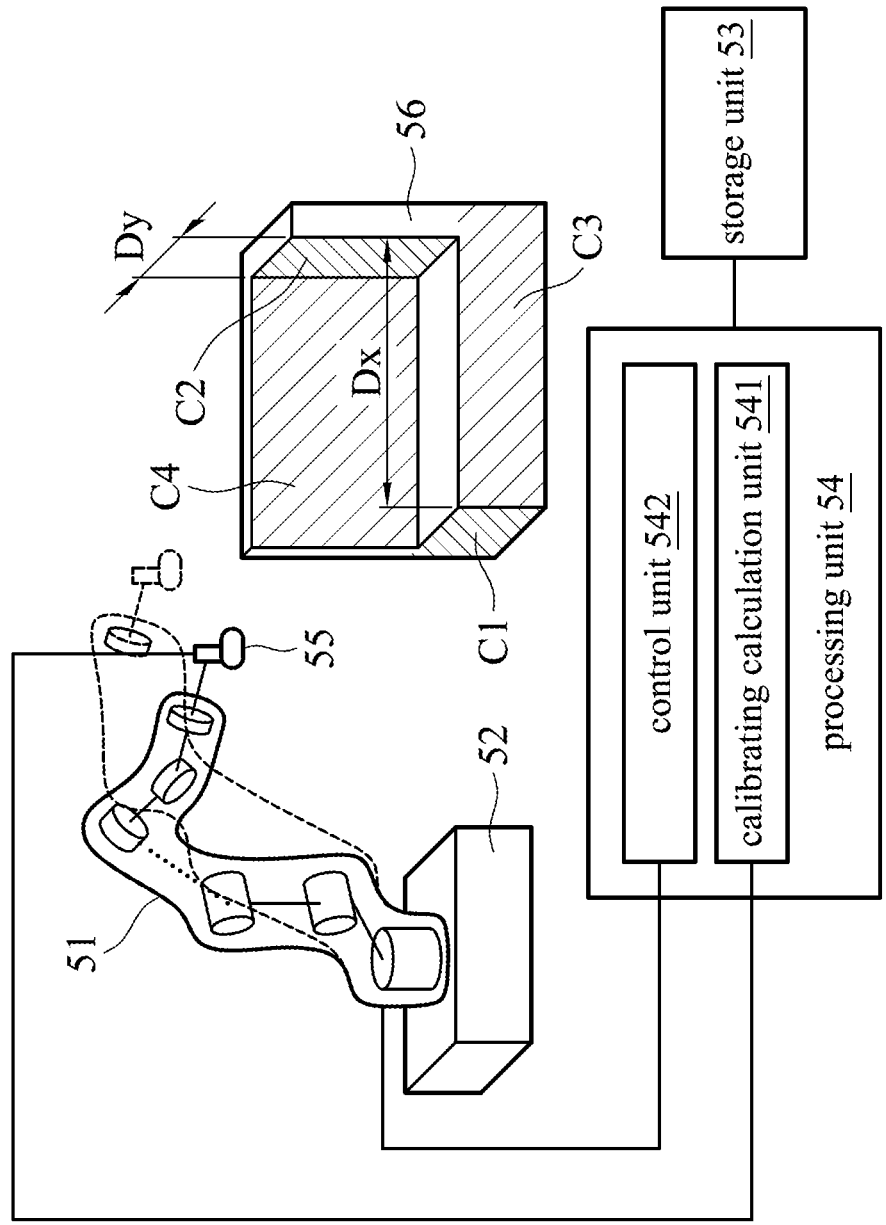
FIG. 5 illustrates that how a robotic arm system 50 measures first-direction measured relative-displacements $\Delta x M x_{i,j}$, i=1, . . . , nx−1, j=i+1, . . . , nx corresponding to the first-direction predictive positioning-points, second-direction measured relative-displacements $\Delta y M y_{i,j}$, i=1, . . . , ny−1, j=i+1, . . . , ny corresponding to the second-direction predictive positioning-points, and third-direction measured relative-displacements $\Delta z M z_{i,j}$, i=1, . . . , ny−1, j=i+1, . . . ,nz corresponding to the third-direction predictive positioning-points according to an embodiment of the present disclosure.

FIG. 5 illustrates that how a robotic arm system 50 measures first-direction measured relative-displacements $\Delta xMx_{i,j}$, i=1, ..., nx−1, j=i+1, ..., nx corresponding to the first-direction predictive positioning-points, second-direction measured relative-displacements $\Delta yMy_{i,j}$, i=1, ..., ny−1, j=i+1, ..., ny corresponding to the second-direction predictive positioning-points, and third-direction measured relative-displacements $\Delta zMz_{i,j}$, i=1, ..., ny−1, j=i+1, ..., nz corresponding to the third-direction predictive positioning-points according to an embodiment of the present disclosure. Similar to the robotic arm system 40 shown in FIG. 4, the robotic arm system 50 shown in FIG. 5 comprises a robotic arm 51, a base 52, a storage unit 53, a processing unit 54, a measuring instrument 55 and a calibration (fixture) block 56. The robotic arm 51 is disposed on the base 52 and is electrically connected to the processing unit 54. The processing unit 54 is electrically connected to the storage unit 53 and the measuring instrument 55. The storage unit 53 is used to store the mechanism parameter sets $xS_1 \sim xS_{nx}$ corresponding to the first-direction predictive positioning-points $xP_1 \sim xP_{nx}$, the mechanism parameter sets $yS_1 \sim yS_{ny}$ corresponding to the second-direction predictive positioning-points $yP_1 \sim yP_{ny}$ and the mechanism parameter sets $zS_1 \sim zS_{nz}$ corresponding to the third-direction predictive positioning-points $zP_1 \sim zP_{nz}$ of the robotic arm 51. The processing unit 54 comprises a calibrating calculation unit 541 and a control unit 542. The calibration block 56 comprises a first precision plane C1, a second precision plane C2, a third precision plane C3, a fourth precision plane C4, a fifth precision plane C5 (not shown) and a sixth precision plane C6 (not shown).

In FIG. 5, when the robotic arm system 50 proceeds with the measurement, the X-direction first boundary plane and the X-direction second boundary plane are implemented by the first precision plane C1 and the second precision plane C2 respectively, the Y-direction first boundary plane and the Y-direction second boundary plane are implemented by the third precision plane C3 and the fourth precision plane C4 respectively, and the Z-direction first boundary plane and the Z-direction second boundary plane are implemented by the fifth precision plane C5 and the sixth precision plane C6 respectively. The first precision plane C1 and the second precision plane C2 are the first-direction displacement parameter D apart, and the first precision plane C1 and the second precision plane C2 are both perpendicular to the first direction. The third precision plane C3 and the fourth precision plane C4 are the second-direction displacement parameter Dy apart, and the third precision plane C3 and the fourth precision plane C4 are both perpendicular to the second direction. The fifth precision plane C5 and the sixth precision plane C6 are the third-direction displacement parameter Dz apart, and the fifth precision plane C5 and the sixth precision plane C6 are both perpendicular to the third direction. The present disclosure is not limited thereto. E.g. the robotic arm system 50 can directly move the calibration block 56 in the first direction so that the first precision plane C1 is equivalent to the second precision plane C2. In FIG. 5, the calibration block 56 can be a straight edge, a processing machinery fixture block or other hardware structures which have at least one high precision plane for measured displacement.

In FIG. 5, the first-direction predictive positioning-points $xP_k$, k=1, ..., nx are described as a set of functions $F(xS_k + \Delta S)$, k=1, ..., nx corresponding to the mechanism parameter sets $xS_k$, k=1, ..., nx. The calibration calculation unit 541 of the processing unit 54 determines a first-direction predictive relative-displacement $\Delta xP_{i,j} = xP_j - xP_i$ between each two of the first-direction predictive positioning-points $xP_1 \sim xP_{nx}$. The three-dimensional predictive relative-displacement equation $G(xS_i, xS_j, \Delta S)$ between two of the first-direction predictive positioning-points $xP_i$ and $xP_j$ is represented below:

$$\Delta xP_{i,j} = xP_j - xP_i$$
$$\equiv F(xS_j + \Delta S) - F(xS_i + \Delta S)$$
$$\equiv G(xS_i, xS_j, \Delta S)$$
$$= \begin{bmatrix} g_x(xS_i, xS_j, \Delta S) \\ g_y(xS_i, xS_j, \Delta S) \\ g_z(xS_i, xS_j, \Delta S) \end{bmatrix},$$

$$i = 1, \ldots, nx-1, \ j = i+1, \ldots, nx$$

Accordingly, the calibration calculation unit 541 of the processing unit 54 calculates the first-direction predictive relative-displacement equations $g_x(xS_i, xS_j, \Delta S)$ corresponding to the first-direction predictive positioning-points.

In FIG. 5, the measuring instrument 55 measures a first-direction measured displacement $xMx_k$ between the end of the robotic arm 51 and the first precision plane C1 while performing each of the actions.

The calibration calculation unit 541 determines, according to the first-direction measured displacements $xMx_k$, a first-direction measured relative-displacement $\Delta xMx_{i,j}$, i=1, ..., nx−1, j=i+1, ..., nx moved by the end of the robotic arm 51 while performing each two of the actions.

In FIG. 5, the processing unit 54 controls the posture of the robotic arm 51 so that the measuring direction of the measuring instrument 55 is forward, toward the first precision plane C1 of the calibration block 56. Then the processing unit 54 controls the robotic arm 51 so that the end of the robotic arm 51 moves toward the first-direction predictive positioning-points $xP_1 \sim xP_{nx}$ which are located within sensing range of the measuring instrument 55. At this moment, the measuring instrument 55 measures the first-direction measured displacement $xMx_k$, k=1, ..., nx ($xMx_1 \sim xMx_{nx}$) between the end of the robotic arm 51 and the first precision plane C1. The processing unit 54 determines the first-direction measured relative-displacement $\Delta xMx_{i,j}$, i=1, ..., nx−1, j=i+1, ..., nx corresponding to the first-direction predictive relative-displacement $\Delta xP_{i,j}$ according to the first-direction measured displacements xMx$_1$~xMx$_{nx}$. The first-direction measured relative-displacement ΔxMx$_{i,j}$ is a relative displacement measured by one-dimensional measurement by the measuring instrument 55.

In FIG. 5, the first-direction measured relative-displacement ΔxMx$_{i,j}$ corresponding to the first-direction predictive positioning-points xP$_i$ and xP$_j$ is represented below:

$$\Delta xMx_{i,j} = xMx_j - xMx_i + Dx' \; i=1,\ldots, nx-1, j=i+1,\ldots, nx$$

Wherein if the first-direction measured displacements xMx$_i$ and xMx$_j$ are measured by the same precision plane (e.g. both measured by the first precision plane C1), then the value of Dx is 0. If the first-direction measured displacements xMx$_i$ and xMx$_j$ are measured by two parallel precision planes (e.g. measured by the first precision plane C1 and the second precision plane C2), then Dx is a first-direction relative displacement between the two parallel precision planes.

In FIG. 5, the distance between the measuring instrument 55 and the first precision plane C1 is required to be smaller than the sensing range of the measuring instrument 55. Because the first-direction predictive positioning-points xP$_1$~xP$_{nx}$ are not all located within sensing range of the measuring instrument 55, it is required to increase the sensing displacement measured by the measuring instrument 55. Accordingly, the robotic arm system 50 uses the second precision plane C2 which is the first-direction displacement Dx away from the first precision plane C1 to solve the inadequate sensing range of the measuring instrument 55. In addition, if the first-direction predictive positioning-points xP$_1$~xP$_{nx}$ are all located within sensing range of the measuring instrument 55, the robotic arm system 50 only requires the first precision C1 to measure the first-direction measured relative-displacement ΔxMx$_{i,j}$.

When a first-direction pitch between an out-of-range first-direction predictive positioning-point xP$_k$ and the first precision plane C1 exceeds the maximum sensing range of the measuring instrument 55 in the first direction, the processing unit 54 controls the robotic arm 51 so that the end of the robotic arm 51 moves toward the out-of-range first-direction predictive positioning-point xP$_k$ which is in front of the second precision plane C2 of the calibration block 56 to sense the first-direction measured displacement ΔxMx$_{i,j}$ between the end of the robotic arm 51 and the first precision plane C1. Through the method of adding a boundary plane, the first-direction measured relative-displacement ΔxMx$_{i,j}$ corresponding to the first-direction predictive positioning-points xP$_i$ and xP$_j$ is not limited to the sensing range of the measuring instrument 55.

Figure 1:
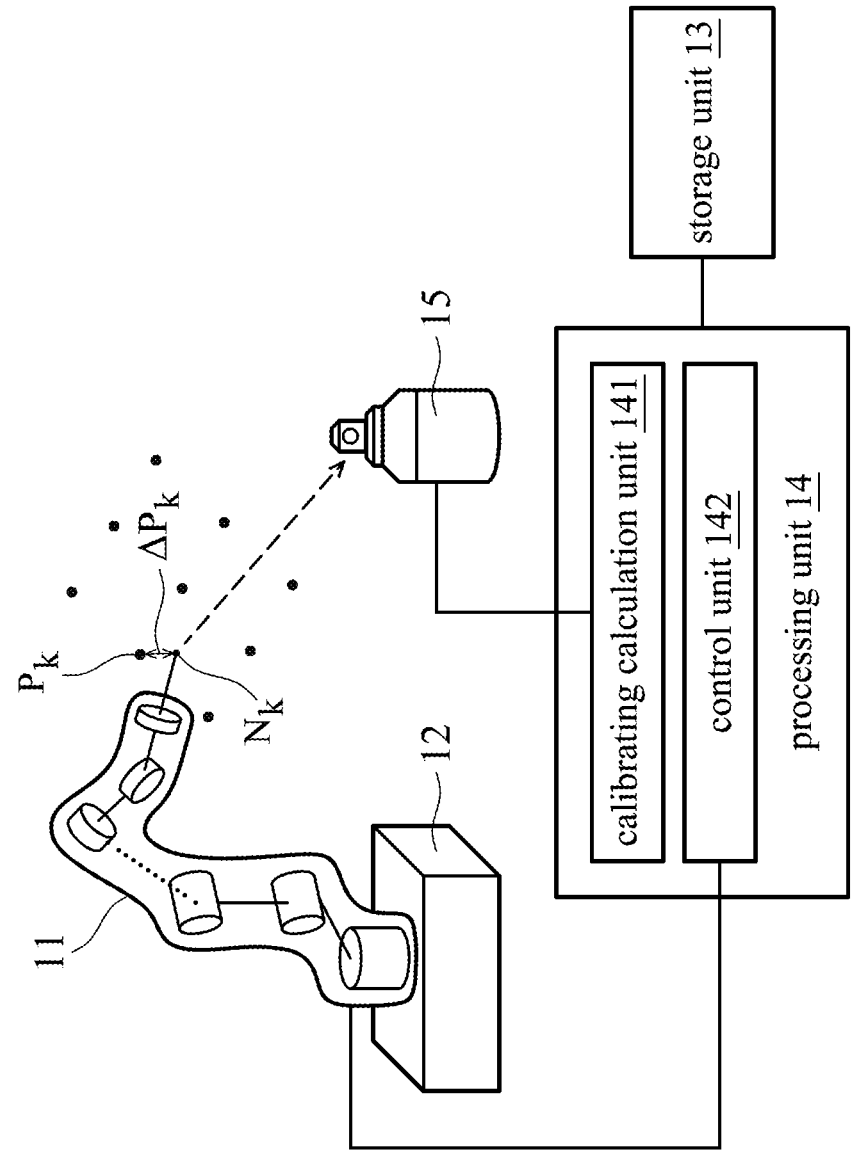
FIG. 1 is a schematic diagram of the robotic arm system 10.

Unlike the measuring instrument 25 illustrated in FIG. 2, the measuring instrument 55 of the robotic arm system 50 in FIG. 5 is disposed on the end of the robotic arm 51. Therefore the measuring instrument 55 can be a probe, a dial gauge, or a laser displacement meter, which performs one-dimensional displacement measurement, or it can be a contact instrument or a non-contact instrument which performs displacement measurement. The displacement meter adopted by the measuring instrument 55 costs less and can be used to obtain practical measurements more easily than either the measuring instrument 25 illustrated in FIG. 2 or the measuring instrument 15 in FIG. 1.

In the same manner, the measuring instrument 55 of the robotic arm system 50 measures, through the third precision plane C3 and the fourth precision plane C4, the second-direction predictive positioning-points yP$_k$, k=1, ..., ny (yP$_1$~yP$_{ny}$) to obtain the second-direction measured relative-displacements ΔyMy$_{i,j}$, i=1, ..., ny-1, j=i+1, ..., ny corresponding to the second-direction predictive positioning-points yP$_i$ and yp$_j$. The processing unit 54 obtains the second-direction predictive relative-displacement equation g$_y$(yS$_i$, yS$_j$, ΔS) according to the mechanism parameter sets yS$_1$~yS$_{ny}$.

Similarly, the processing unit 54 obtains the third-direction predictive relative-displacement equation g$_z$(zS$_i$, zS$_j$, ΔS) according to the mechanism parameter sets zS$_1$~zS$_{nz}$. The measuring instrument 55 also measures, through the fifth precision plane C5 and the sixth precision plane C6, the third-direction predictive positioning-points zP$_k$, k=1, ..., nz (zP$_1$~zP$_{nz}$) to obtain the third-direction measured relative-displacements ΔzMz$_{i,j}$, i=1, ..., nz-1, j=i+1, ..., nz corresponding to the third-direction predictive positioning-points zP$_i$ and zP$_j$.

Then the calibration calculation unit 541 of the processing unit 54 calculates an optimization equation Φ according to g$_x$(xS$_i$, xS$_j$, ΔS), ΔxMx$_{i,j}$, g$_y$(yS$_i$, yS$_j$, ΔS), ΔyMy$_{i,j}$, g$_z$(zS$_i$, zS$_j$, ΔS) and ΔzMz$_{i,j}$.

Then the processing unit 54 of the robotic arm system 50 also utilizes an optimization algorithm and the optimization equation Φ to obtain a set of optimal mechanism parametric deviations ΔS. Finally, the processing unit 54 of the robotic arm system 50 uses the set of optimal mechanism parametric deviations ΔS to calibrate the mechanism parameter sets xS$_1$~xS$_n$, corresponding to the first-direction predictive positioning-points xP$_1$~xP$_{nx}$, the mechanism parameter sets yS$_1$~yS$_{ny}$ corresponding to the second-direction predictive positioning-points yP$_1$~yP$_{ny}$ and the mechanism parameter sets zS$_1$~zS$_{nz}$ corresponding to the third-direction predictive positioning-points zP$_1$~zP$_{nz}$ of the robotic arm 51.

Figure 6:
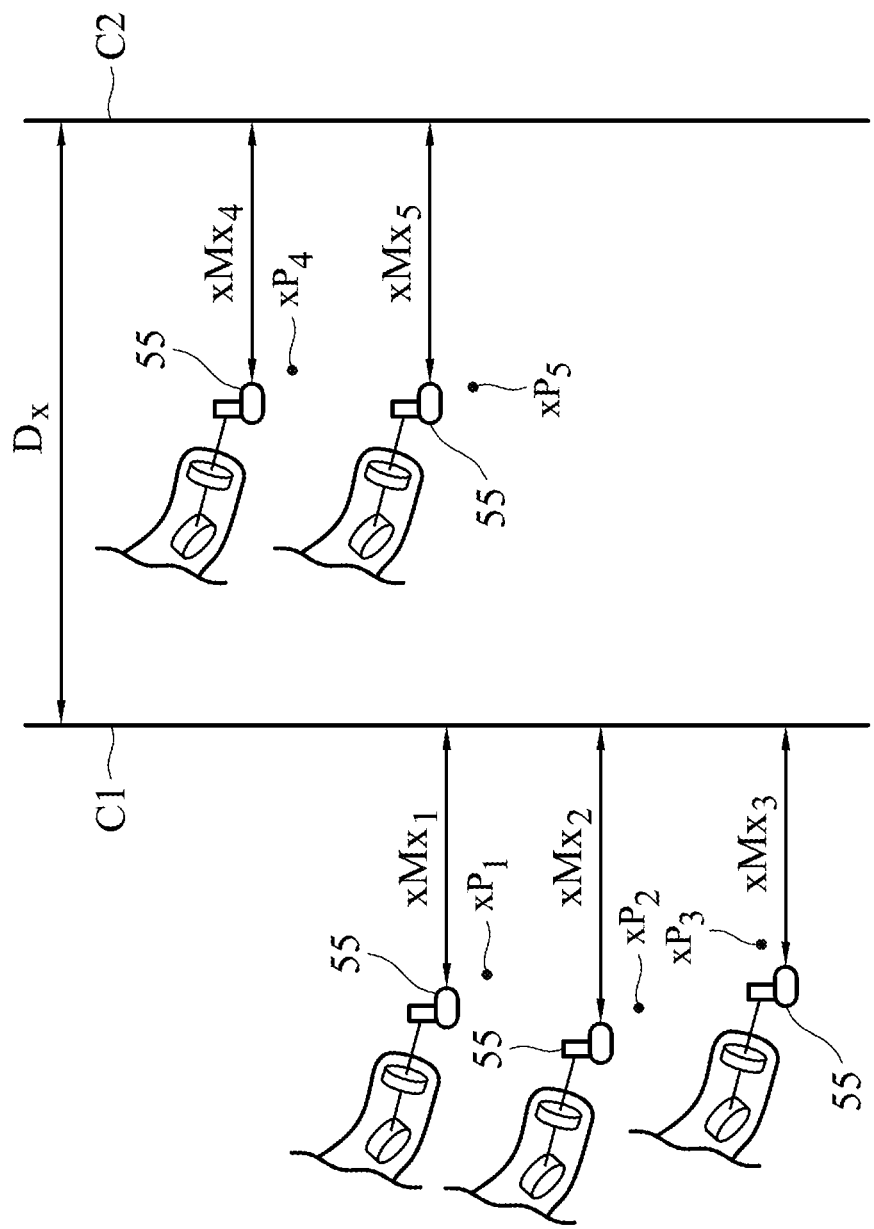
FIG. 6 illustrates how the robotic system 50 measures the first-direction measured relative-displacements $\Delta x M x_{i,j}$, i=1, . . . ,4, j=i+1, . . . ,5 corresponding to the first-direction predictive positioning-points $xP_1$~$xP_5$ according to an embodiment of the present disclosure.

FIG. 6 illustrates how the robotic system 50 measures the first-direction measured relative-displacement ΔxMx$_{i,j}$, i=1, ..., 4, j=i+1, ..., 5 corresponding to the first-direction predictive positioning-points xP$_1$~xP$_5$ according to an embodiment of the present disclosure. In FIG. 6, the processing unit 54 of the robotic system 50 controls, according to a plurality of mechanism parameter sets xS$_1$~xS$_5$, the robotic arm 51 to perform a plurality of actions so that the end of the robotic arm 51 moves toward the corresponding plurality of first-direction predictive positioning-points xP$_1$~xP$_5$.

In FIG. 6, the processing unit 54 of the robotic system 50 controls the posture of the robotic arm 51 so that the measuring direction of the measuring instrument 55 towards the first precision plane C1 of the calibration block 56. Then the processing unit 54 controls, according to a plurality of mechanism parameter sets xS$_1$~xS$_3$, the robotic arm 51 so that the end of the robotic arm 51 moves toward the first-direction predictive positioning-points xP$_1$~xP$_3$ which are located within sensing range of the measuring instrument 55. At this moment, the measuring instrument 55 measures the first-direction measured displacements xMx$_1$, xMx$_2$, xMx$_3$ between the end of the robotic arm 51 and the first precision plane C1. The processing unit 54 respectively determines the first-direction measured relative-displacements ΔxMx$_{1,2}$ (i.e. xMx$_2$-xMx$_1$), ΔxMx$_{1,3}$ (i.e. xMx$_3$-xMx$_1$), ΔxMx$_{2,3}$ (i.e. xMx$_3$-xMx$_{21}$) corresponding to the first-direction predictive relative-displacement ΔxP$_{1,2}$, ΔxP$_{1,3}$, ΔxP$_{2,3}$ according to the first-direction measured displacements xMx$_1$~xMx$_3$.

Because the first-direction predictive positioning-points xP$_4$ and xP$_5$ with respect to the first precision plane C1 are located out of sensing range of the measuring instrument 55, the measuring instrument 55 measures the first-direction measured displacements xMx$_4$, xMx$_5$ between the end of the robotic arm 51 and the second precision plane C2. The processing unit 54 respectively determines the first-direction measured relative-displacement $\Delta xMx_{5,4}$ (i.e. $xMx_5 - xMx_{41}$) corresponding to the first-direction predictive relative-displacement $\Delta xP_{4,5}$ according to the first-direction measured displacements $xMx_4$ and $xMx_5$.

In FIG. 6, when the processing unit 54 of the robotic system 50 calculates the first-direction measured relative-displacement $\Delta xMx_{i,j}$ (e.g. $\Delta xMx_{1,4}$) measured from two different sensing ranges, the first-direction relative displacement Dx between the two parallel precision planes is taken into consideration. Therefore the first-direction measured relative-displacements $\Delta xMx_{i,j}$ are represented below:

$$\Delta xMx_{i,j} = xMx_j - xMx_i + Dx,\ i=1,2,3,\ j=4,5$$

Figure 7:
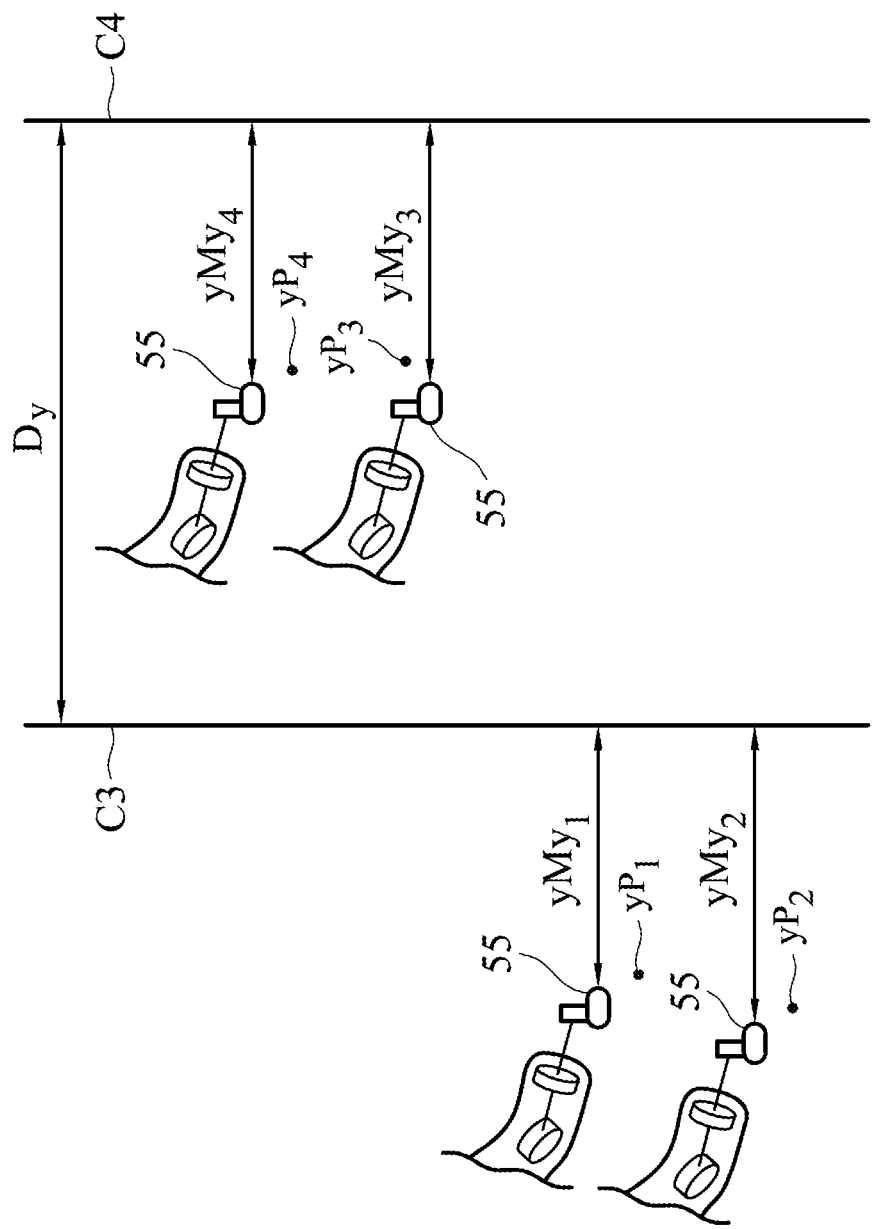
FIG. 7 illustrates how the robotic system 50 measures the second-direction measured relative-displacements $\Delta yMy_{i,j}$, i=1, . . . ,3, j=i+1, . . . ,4 corresponding to the second-direction predictive positioning-points $yP_1$~$yP_4$ according to an embodiment of the present disclosure.
Figure 8A:
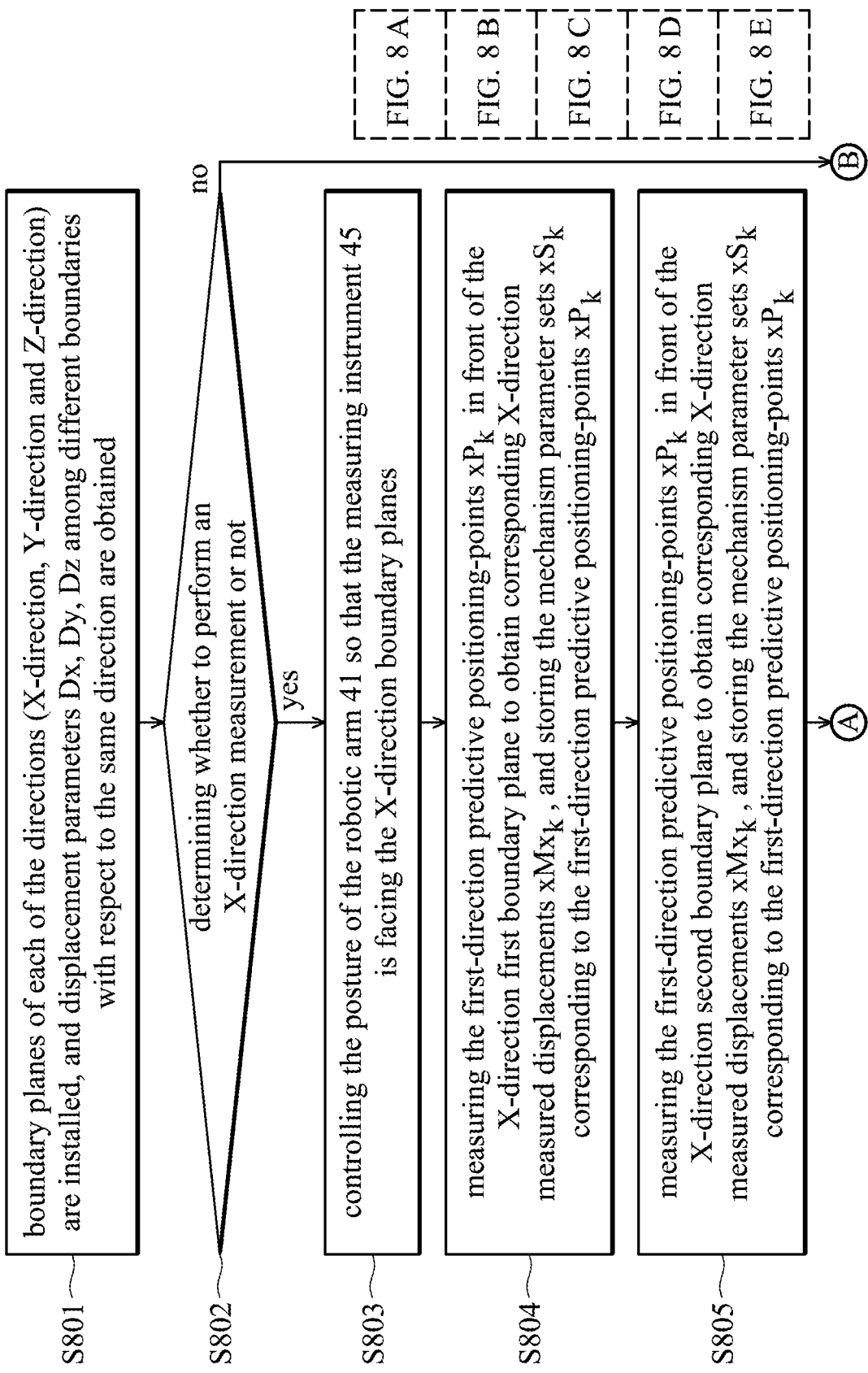
FIGS. 8A-8E show a flow diagram illustrating a mechanism-parametric-calibration method for the robotic arm system 40.
Figure 8B:
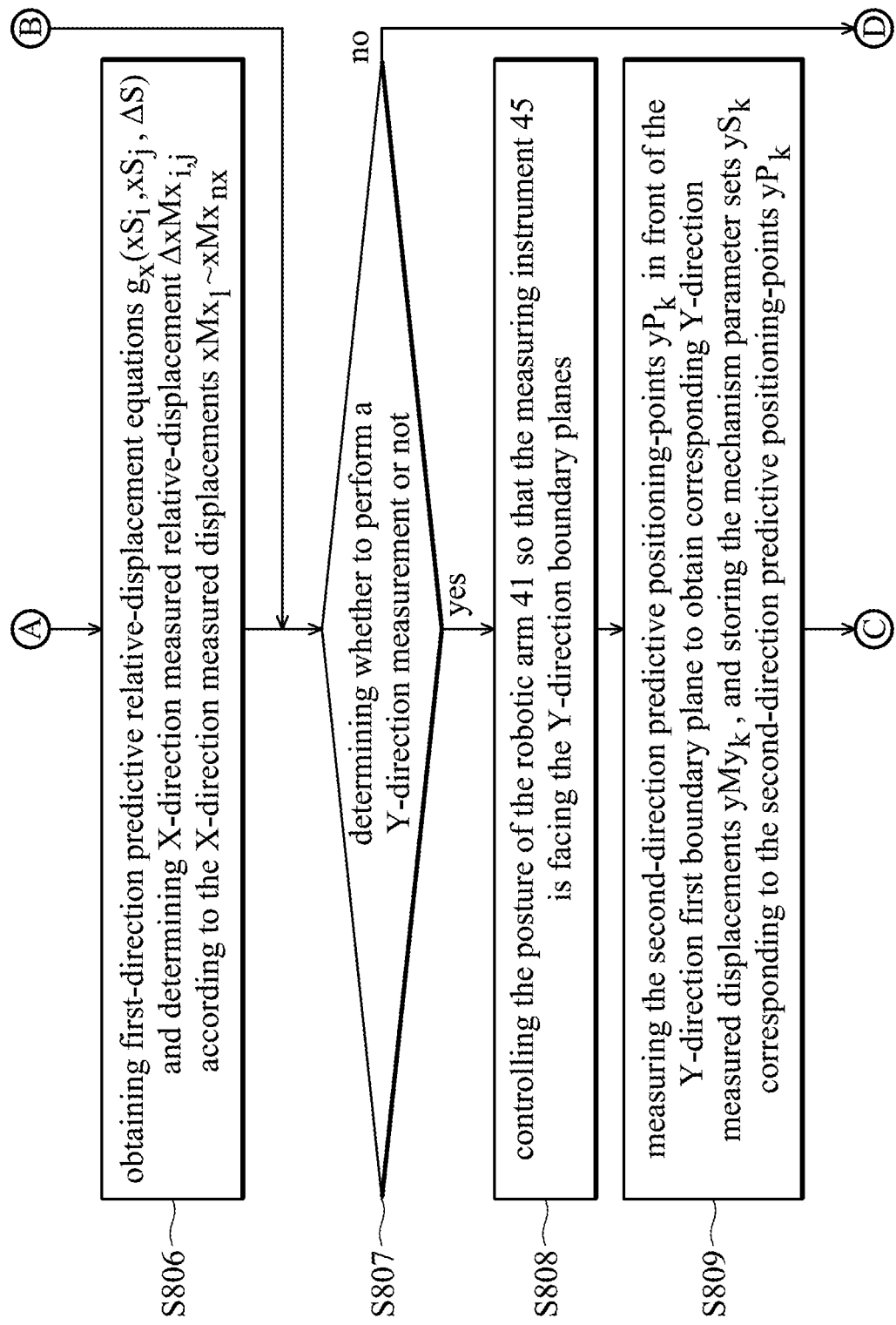
Figure 8C:
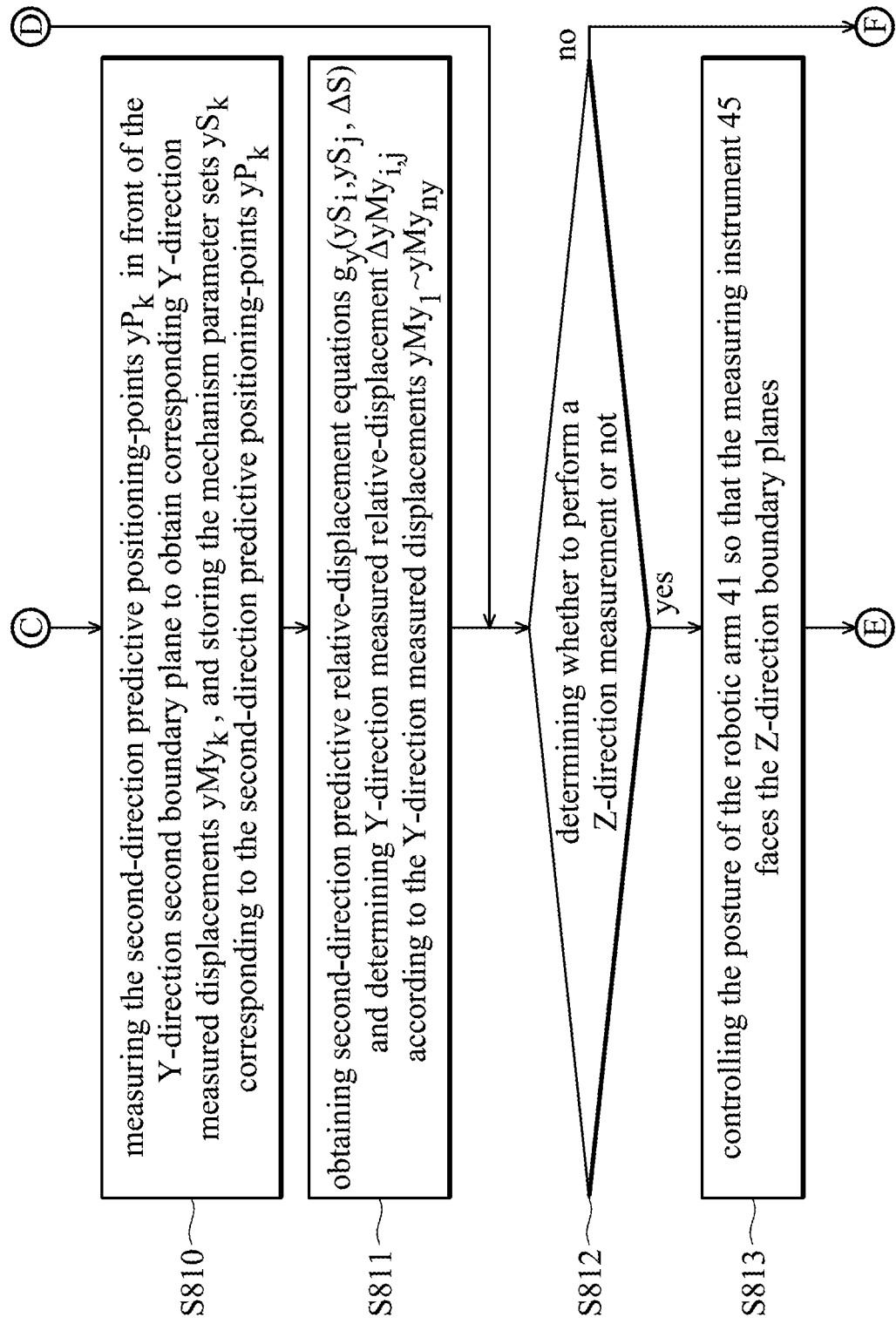
Figure 8D:
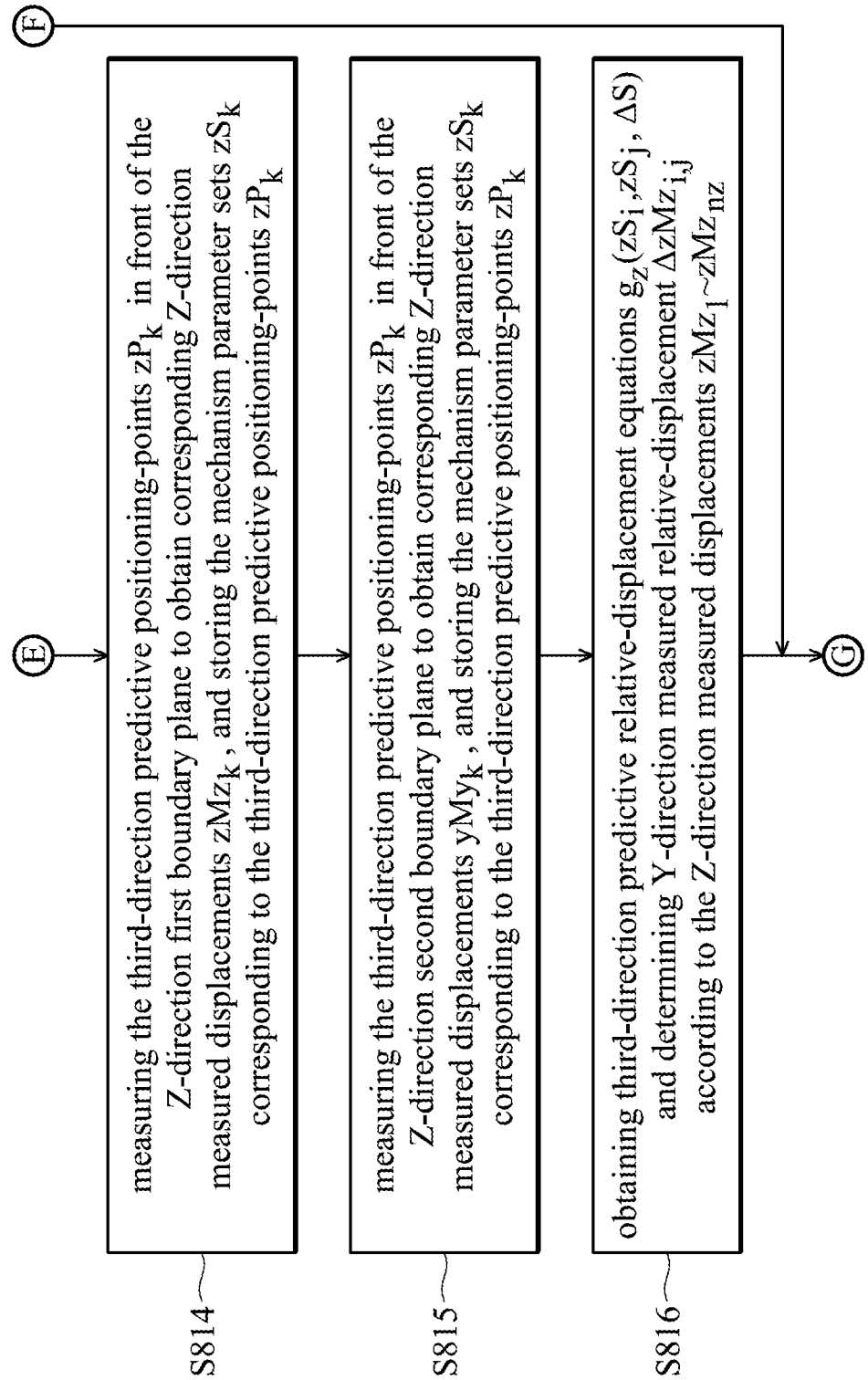
Figure 8E:
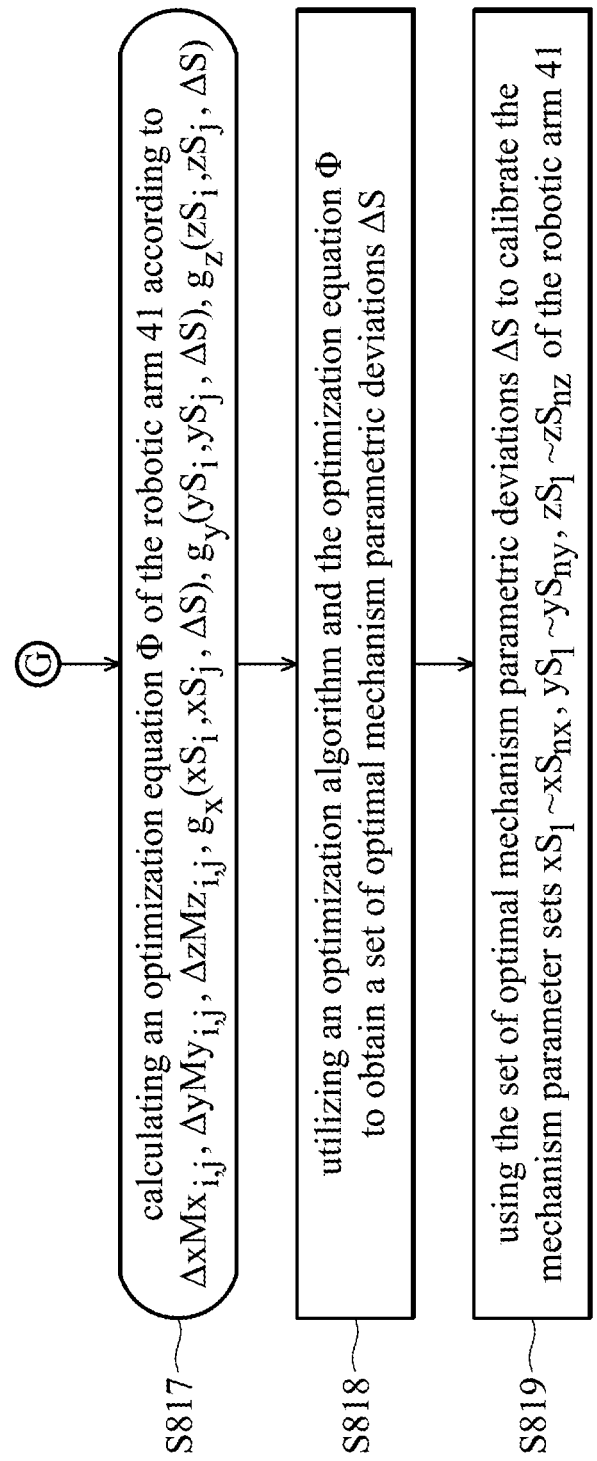

FIG. 7 illustrates how the robotic system 50 measures the second-direction measured relative-displacement $\Delta yMy_{i,j}$, $i=1,\ldots,3, j=i+1,\ldots,4$ corresponding to the second-direction predictive positioning-points $yP_1 \sim yP_4$ according to an embodiment of the present disclosure. In FIG. 7, the processing unit 54 of the robotic system 50 controls, according to a plurality of mechanism parameter sets $yS_1 \sim yS_4$, the robotic arm 51 to perform a plurality of actions so that the end of the robotic arm 51 moves toward the corresponding plurality of second-direction predictive positioning-points $yP_1 \sim yP_4$.

In FIG. 7, the second-direction predictive positioning-points $yP_1 \sim yP_2$ are located within sensing range of the measuring instrument 55 with respect to the third precision plane C3, and the second-direction predictive positioning-points $yP_3 \sim yP_4$ are located within sensing range of the measuring instrument 55 with respect to the fourth precision plane C4. The measuring instrument 55 measures the second-direction measured displacements $yMy_1$ and $yMy_2$ between the end of the robotic arm 51 and the third precision plane C3. Then the measuring instrument 55 measures the second-direction measured displacements $yMy_3$ and $yMy_4$ between the end of the robotic arm 51 and the fourth precision plane C4. The processing unit 54 respectively determines the second-direction measured relative-displacements $\Delta yMy_{1,2}$ (i.e. $yMy_2 - yMy_1$) and $\Delta yMy_{3,4}$ (i.e. $yMy_4 - yMy_3$) corresponding to the second-direction predictive relative-displacements $\Delta yP_{1,2}$ and $\Delta yP_{3,4}$. Similarly, in consideration of a second-direction relative displacement Dy between the third precision plane C3 and the fourth precision plane C4, the processing unit 54 obtains second-direction measured relative-displacements $\Delta yMy_{i,j} = yMy_j - yMy_i + Dy$, $i=1,2, j=3,4$.

Similarly, using the same measuring method used in FIG. 6 and FIG. 7, the robotic system 50 may also obtain third-direction measured relative-displacements $\Delta zMz_{i,j}$, $i=1,\ldots,nz-1$, $j=i+1,\ldots,nz$ corresponding to the third-direction predictive positioning-points according to the mechanism parameter sets $zS_1 \sim zS_{nz}$.

FIGS. 8A-8E show a flow diagram illustrating a mechanism-parametric-calibration method for the robotic arm system 40. In step S801, boundary planes of each of the directions (X-direction, Y-direction and Z-direction) are installed, and displacements parameters Dx, Dy, Dz among different boundaries with respect to the same direction are obtained. In step S802, the robotic arm system 40 or a manipulator of the robotic arm system 40 determines whether to perform an X-direction measurement or not. If yes, the method proceeds to step S803. Otherwise, the method proceeds to step S807. In step S803, the processing unit 44 of the robotic arm system 40 controls the posture of the robotic arm 41 so that the measuring instrument 45 is facing the X-direction boundary planes.

In step S804, the processing unit 44 of the robotic arm system 40 controls the robotic arm 41 so that the robotic arm 41 moves toward random distinct first-direction predictive positioning-points $xP_k$ in front of the X-direction first boundary plane. At this moment, the measuring instrument 45 measures the first-direction predictive positioning-points $xP_k$ in front of the X-direction first boundary plane to obtain corresponding X-direction measured displacements $xMx_k$, and the mechanism parameter sets $xS_k$ corresponding to the first-direction predictive positioning-points $xP_k$ are stored.

In step S805, the processing unit 44 of the robotic arm system 40 controls the robotic arm 41 so that the robotic arm 41 moves toward random distinct first-direction predictive positioning-points $xP_k$ in front of the X-direction second boundary plane. At this moment, the measuring instrument 45 measures the first-direction predictive positioning-points $xP_k$ in front of the X-direction second boundary plane to obtain corresponding X-direction measured displacements $xMx_k$, and the mechanism parameter sets $xS_k$ corresponding to the first-direction predictive positioning-points $xP_k$ are stored. In step S806, the processing unit 44 of the robotic arm system 40 obtains first-direction predictive relative-displacement equations $g_x(xS_i, xS_j, \Delta S)$ corresponding to the first-direction predictive positioning-points and determines X-direction measured relative-displacement $\Delta xMx_{i,j}$ according to the X-direction measured displacements $xMx_1 \sim xMx_{nx}$. Then the method proceeds to step S807.

In step S807, the robotic arm system 40 or the manipulator of the robotic arm system 40 determines whether to perform a Y-direction measurement or not. If yes, the method proceeds to step S808. Otherwise, the method proceeds to step S8012. In step S808, the processing unit 44 of the robotic system 40 controls the posture of the robotic arm 41 so that the measuring instrument 45 is facing the Y-direction boundary planes.

In step S809, the processing unit 44 of the robotic arm system 40 controls the robotic arm 41 so that the robotic arm 41 moves toward random distinct second-direction predictive positioning-points $yP_k$ in front of the Y-direction first boundary plane. At this moment, the measuring instrument 45 measures the second-direction predictive positioning-points $yP_k$ in front of the Y-direction first boundary plane to obtain corresponding Y-direction measured displacements $yMy_k$, and the mechanism parameter sets $yS_k$ corresponding to the second-direction predictive positioning-points $yP_k$ are stored.

In step S810, the processing unit 44 of the robotic arm system 40 controls the robotic arm 41 so that the robotic arm 41 moves toward random distinct second-direction predictive positioning-points $yP_k$ in front of the Y-direction second boundary plane. At this moment, the measuring instrument 45 measures the second-direction predictive positioning-points $yP_k$ in front of the Y-direction second boundary plane to obtain corresponding Y-direction measured displacements $yMy_k$, and the mechanism parameter sets $yS_k$ corresponding to the second-direction predictive positioning-points $yP_k$ are stored. In step S811, the processing unit 44 of the robotic arm system 40 obtains second-direction predictive relative-displacement equations $g_y(yS_i, yS_j, \Delta S)$ corresponding to the second-direction predictive positioning-points and determines Y-direction measured relative-displacement $\Delta yMy_{i,j}$ according to the Y-direction measured displacements $yMy_1 \sim yMy_{ny}$. Then the method proceeds to step S812.

In step S812, the robotic arm system 40 or the manipulator of the robotic arm system 40 determines whether to perform a Z-direction measurement or not. If yes, the method proceeds to step S813. Otherwise, the method proceeds to step S8017. In step S813, the processing unit 44 of the robotic system 40 controls the posture of the robotic arm 41 so that the measuring instrument 45 faces the Z-direction boundary planes.

In step S814, the processing unit 44 of the robotic arm system 40 controls the robotic arm 41 so that the robotic arm 41 moves toward random distinct third-direction predictive positioning-points $zP_k$ in front of the Z-direction first boundary plane. At this moment, the measuring instrument 45 measures the third-direction predictive positioning-points $zP_k$ in front of the Z-direction first boundary plane to obtain corresponding Z-direction measured displacements $zMz_k$, and the mechanism parameter sets $zS_k$ corresponding to the third-direction predictive positioning-points $zP_k$ are stored.

In step S815, the processing unit 44 of the robotic arm system 40 controls the robotic arm 41 so that the robotic arm 41 moves toward random distinct second-direction predictive positioning-points $zP_k$ in front of the Z-direction second boundary plane. At this moment, the measuring instrument 45 measures the third-direction predictive positioning-points $zP_k$ in front of the Z-direction second boundary plane to obtain corresponding Z-direction measured displacements $yMy_k$, and the mechanism parameter sets $zS_k$ corresponding to the third-direction predictive positioning-points $zP_k$ are stored. In step S816, the processing unit 44 of the robotic arm system 40 obtains third-direction predictive relative-displacement equations $g_z(zS_i, zS_j, \Delta S)$ corresponding to the third-direction predictive positioning-points and determines Z-direction measured relative-displacement $\Delta zMz_{i,j}$ according to the Z-direction measured displacements $zMz_1 \sim zMz_{nz}$. Then the method proceeds to step S817.

In step S817, the processing unit 44 of the robotic arm system 40 calculates an optimization equation $\Phi$ of the robotic arm 41 according to $\Delta xMx_{i,j}$, $\Delta yMy_{i,j}$, $\Delta zMz_{i,j}$, $g_x(xS_i, xS_j, \Delta S)$, $g_y(yS_i, yS_j, \Delta S)$, $g_z(zS_i, zS_j, \Delta S)$. In step S818 the processing unit 44 of the robotic arm system 40 utilizes an optimization algorithm and the optimization equation $\Phi$ to obtain a set of optimal mechanism parametric deviations $\Delta S$.

Finally, in step S819, the processing unit 44 of the robotic arm system 40 uses the set of optimal mechanism parametric deviations $\Delta S$ to calibrate the mechanism parameter sets $xS_1 \sim xS_{nx}$ corresponding to the first-direction predictive positioning-points $xP_1 \sim xP_{nx}$, the mechanism parameter sets $yS_1 \sim yS_{ny}$ corresponding to the second-direction predictive positioning-points $yP_1 \sim yP_{ny}$ and the mechanism parameter sets $zS_1 \sim zS_{nz}$ corresponding to the third-direction predictive positioning-points $zP_1 \sim zP_{nz}$ of the robotic arm 41.

As described above, because the factors that affects the set of mechanism parametric deviations $\Delta S$ might include the mechanism transmission error, the load stress variation, and the ambient temperature changes, which means when a robot configuration of the robotic arm system changes, different sets of mechanism parametric deviations $\Delta S$ should be provided for better positioning accuracy. In other words, another set of mechanism parametric deviations $\Delta S$ can be presented as:

$$\Delta S \equiv \Delta S(rConfig)$$

Wherein rConfig is related to a specific status of the robotic arm (such as having a specific hand system, a specific positioning region, a specific mounting (gravity) direction, a specific payload, a specific ambient temperature, or the like). It should be noted that all factors that might cause stress variation or result in different thermal expansion effects should be considered, it is not limited to the factors as described above.

Furthermore, because different status of the robotic arm requires different sets of mechanism parametric deviations $\Delta S(rConfig)$, the calibrating calculation unit 241 of the processing unit 24 may calculate a new optimization equation $\Phi_{rConfig}$ for the new sets of mechanism parametric deviations $\Delta S(rConfig)$. Wherein the new optimization equation $\Phi_{rConfig}$ is represented as:

$$\Phi_{rConfig} = \min_{\Delta S} \sum_{i=1}^{n-1} \sum_{j=i+1}^{n} (\Delta M_{i,j} - G(S_i, S_j, \Delta S(rConfig)))^2$$

When the processing unit 14 determines the robot configuration changes, the processing unit 14 needs to obtain different sets of mechanism parametric deviations $\Delta S$ for the calibration. For example, when the status of the robotic arm is varied so that the stress of the robotic arm exceeds a predetermined range, which means the robotic arm is operated in another robot configuration, the processing unit 114 uses another set of mechanism parametric deviations $\Delta S$. Or when the temperature of the operating environment changes, which means the size of the robotic arm might have different thermal expansion effect, the processing unit 14 must also use another set of mechanism parametric deviations $\Delta S$ for the calibration. Furthermore, the calibration method used herein can be the method as described above or the method recited in the prior art, and it will not be described here to streamline the description.

Figure 9B:
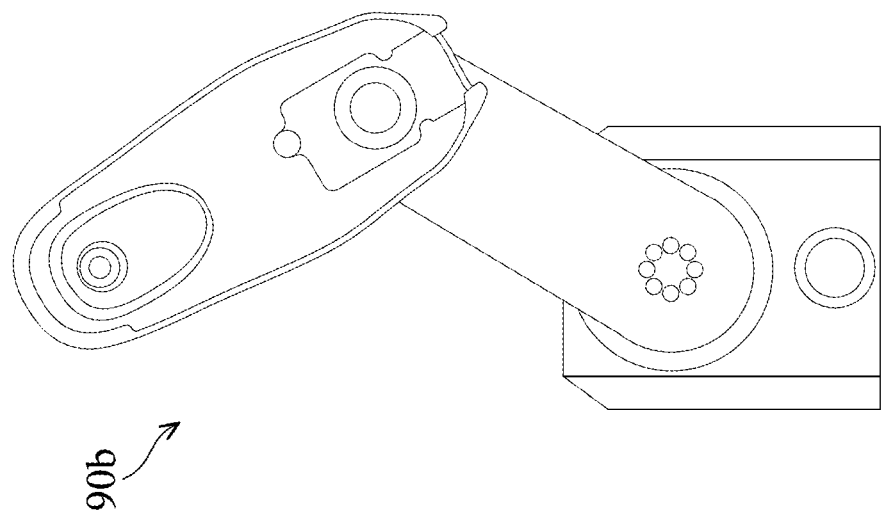
FIGS. 9A and 9B are schematic diagrams of different configurations of the hand system (Lefty/Righty) according to an embodiment of the present invention.
Figure 9A:
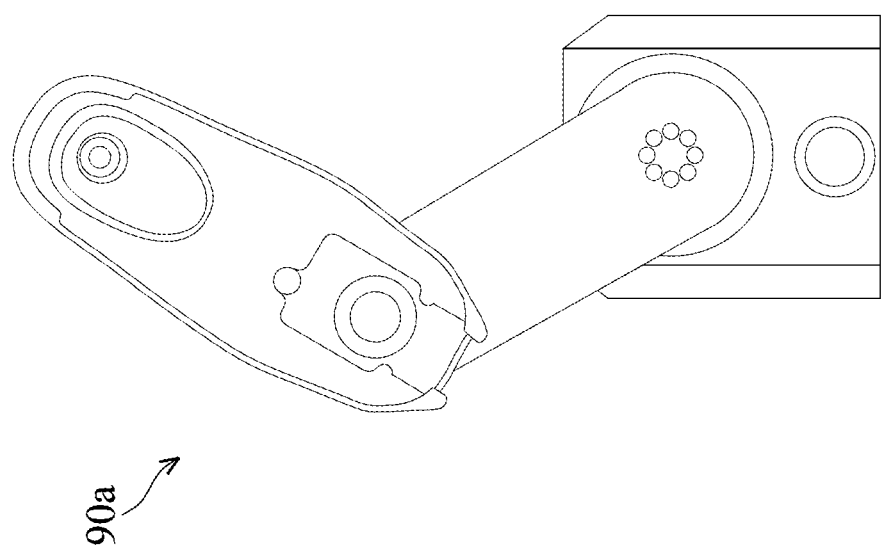

The embodiments as described below provide different examples of the robot configuration. In robotics analysis, there might be multiple solutions of inverse kinematics for a robot pose. That means the robot can reach a specific position in a workspace by several different geometrical hand systems. For example, FIGS. 9A and 9B are schematic diagrams of different configurations of hand systems (Lefty/Righty) of an SCARA at the same position according to some embodiments of the present invention. In the prior art, when the robotic arm performs the same operation and/or in the same workspace, the processing unit 14 applies the same set of mechanism parametric deviations $\Delta S$. However, since the payload will cause an imbalance on a right side due to the influence of gravity when the robot configuration of the robotic arm is lefty hand system (which makes the robotic arm tilts to the right), and the payload will cause an imbalance on a left side due to the influence of gravity when the robot configuration of the robotic arm is righty hand system (which makes the robotic arm tilts to the left), so if the processing unit 14 uses the same set of mechanism parametric deviations $\Delta S$, the positioning accuracy will be reduced. Therefore, for providing better positioning accuracy, the mechanism parameter sets of the robotic arm should be calibrated by using different sets of mechanism parametric deviations $\Delta S$ according to the current robot configuration.

Figure 10B:
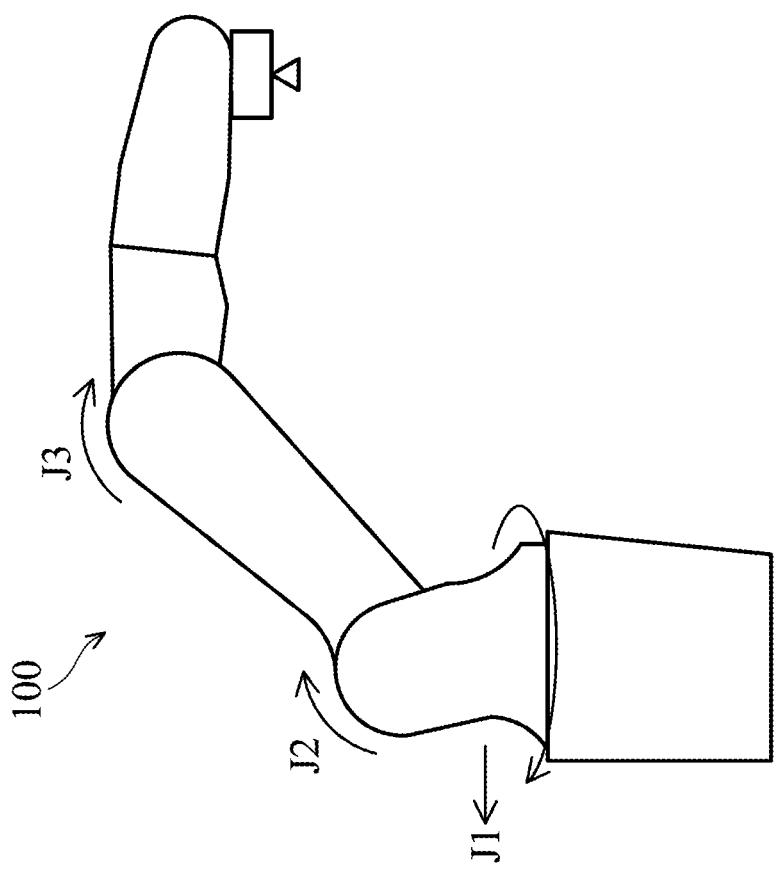
Figure 10A:
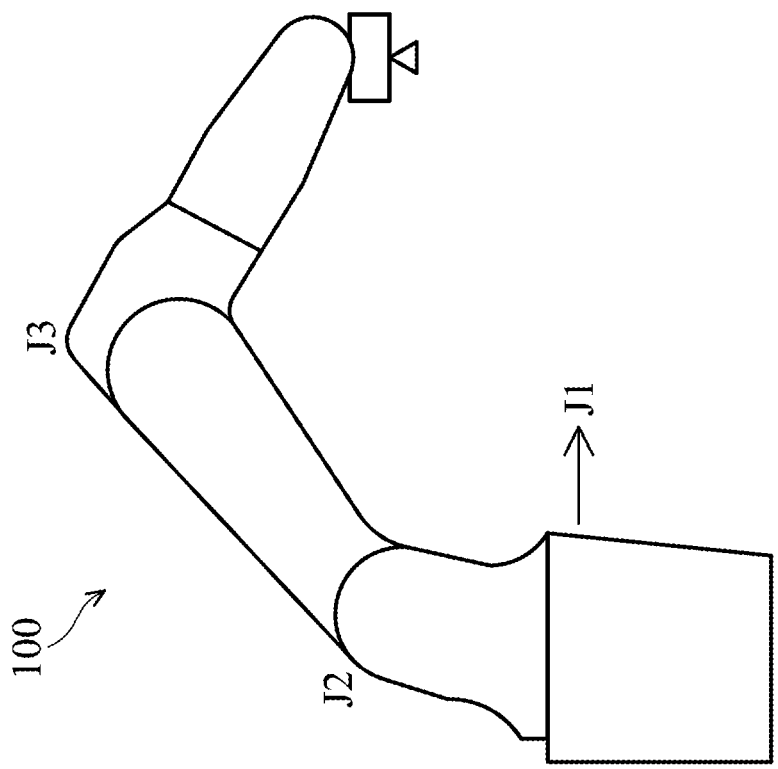

Furthermore, FIGS. 10A-10F are schematic diagrams of different operating configurations of a general 6-axis vertical articulated robot arm reach a predetermined position according to some embodiments of the present invention. As shown in FIGS. 10A and 10B, the robotic configuration of FIG. 10A is a Shoulder-Right (SR) configuration, and the robotic configuration of FIG. 10B is a Shoulder-Left (SL) configuration. The difference between FIGS. 10A and 10B is that the joint axes J1 of the robotic arm performs the operation in different attitude, i.e. the joint axes J1 in FIG. 10A is facing to a positioning region, and the joint axes J1 in FIG. 10B is back to the positioning region. Referring to FIGS. 10C and 10D, the difference between FIGS. 10C and 10D is that a combination of joint axes J2-J3-J5 of FIG. 10C is shown in Elbow-Up (EU), and the combination of joint axes J2-J3-J5 of FIG. 10D is shown in Elbow-Down (ED). Moreover, as shown in FIGS. 10E and 10F, the difference between FIGS. 10E and 10F is that a joint axes J5 of FIG. 10E is operated in Flip (F) way, and the joint axes J5 of FIG. 10F is operated in Non-Flip (NF) way. In other words, the joint axes J5 shown in FIG. 10E rotates positively, and the joint axes J5 shown in FIG. 10F rotates negatively and the joint axes J4 and J6 rotate correspondingly to lead the robot arm approaching the same pose shown in FIG. 10E.

As described, even though the robotic arms shown in FIGS. 10A-10F might operate in the same region and/or have the same payload, but the angles of the joint axes J1-J6 are different, such that the motors still have to provide different power. Therefore, the stress variations in FIGS. 10A-10F will be different. In other words, different sets of mechanism parametric deviations are also needed for providing better positioning accuracy.

Figure 11:
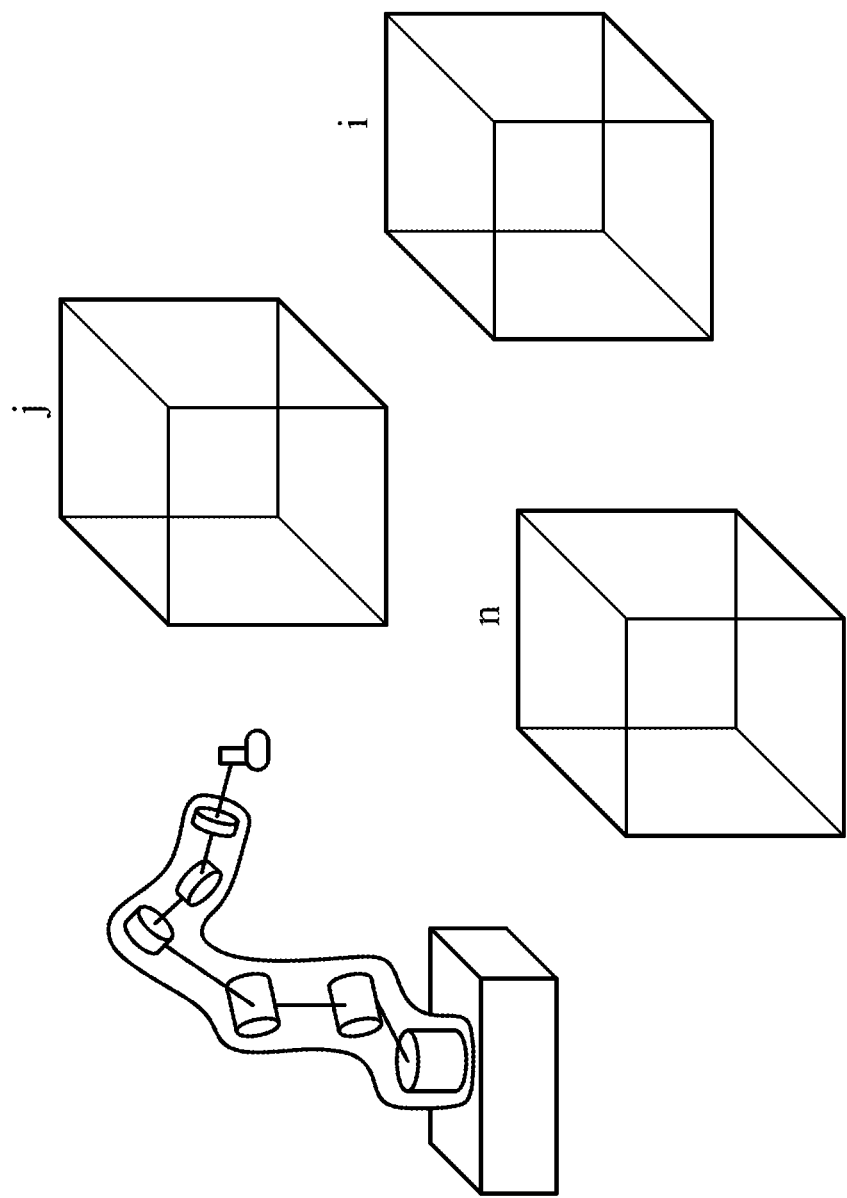
FIG. 11 is a schematic diagram of different positioning region according to an embodiment of the present invention.

FIG. 11 is a schematic diagram of different operating regions according to an embodiment of the present invention. As shown in FIG. 11, while the robotic arm operates in positioning region i, positioning region j or positioning region n, because the robotic arm has to stretch forward at different distances, gravity may cause different stress variations on the robotic arm. For example, when the operating region is farther away from the robot base, the amount of droop of the robotic arms increases. Therefore, when the robotic arm changes to the other positioning region where the extension distance is significantly different, another set of mechanism parametric deviations is needed for each positioning region.

Figure 12A:
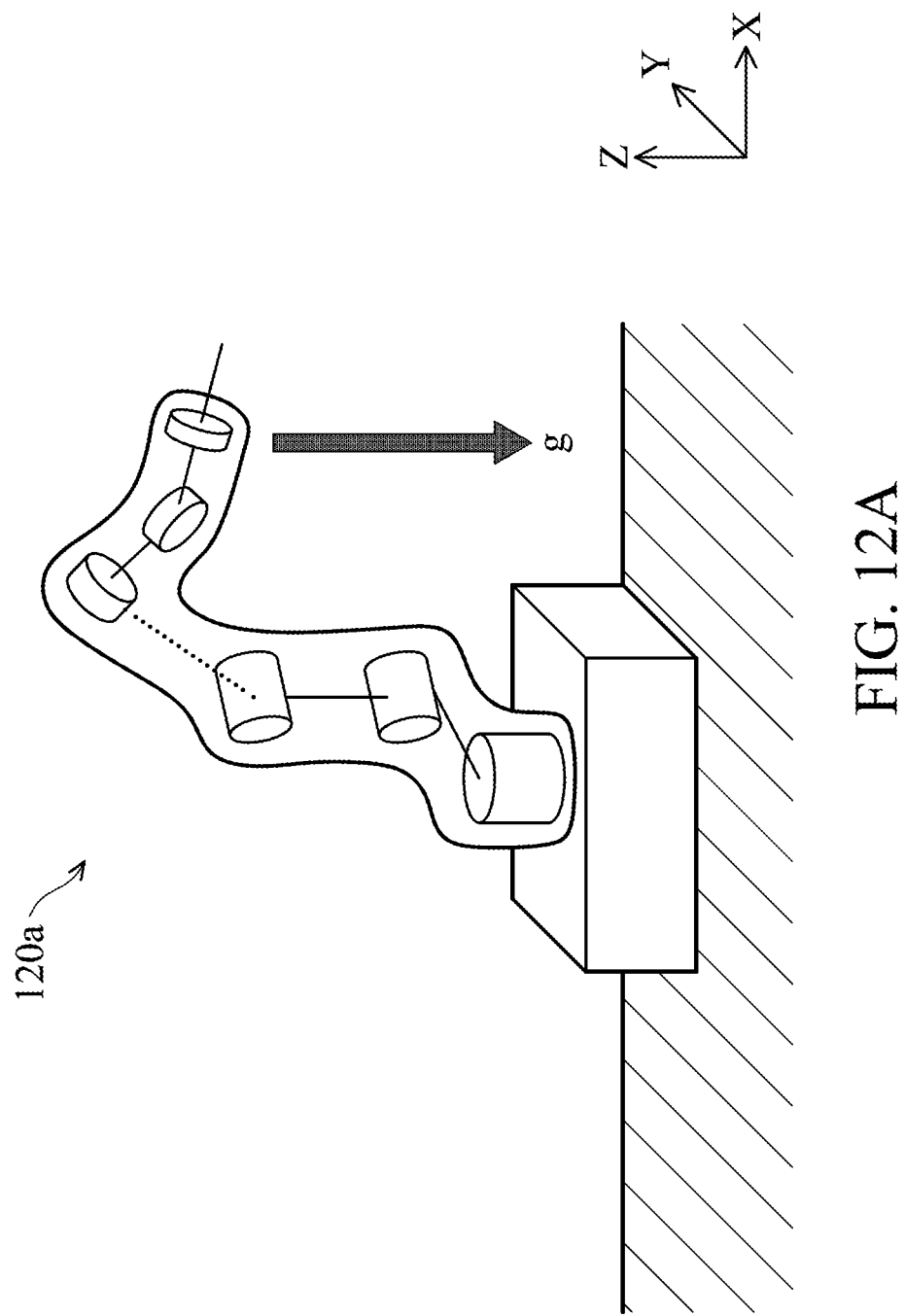
FIGS. 12A-12C are schematic diagrams of different mounting direction corresponding to the robotic arm according to some embodiments of the present invention.
Figure 12B:
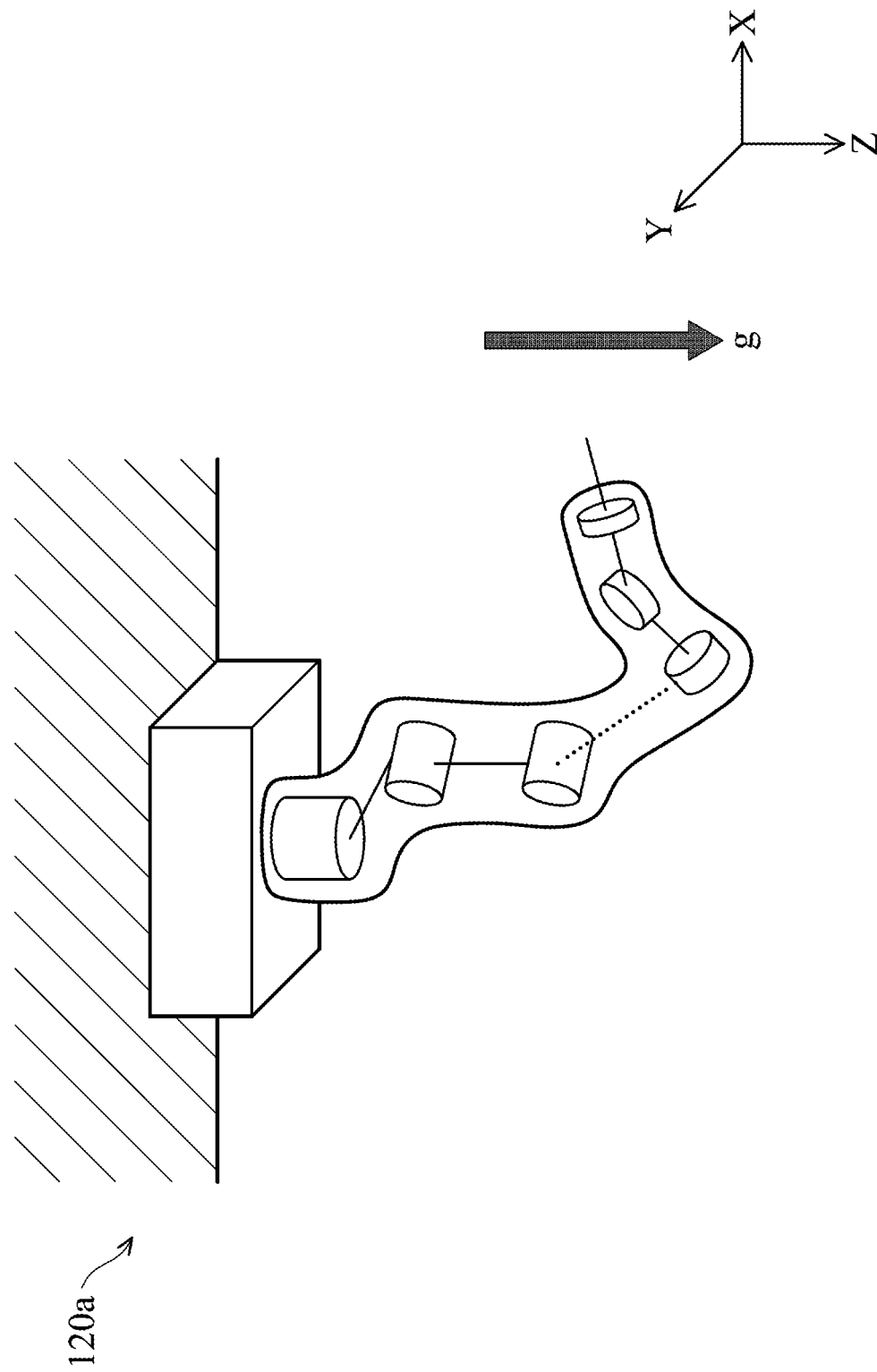
Figure 12C:
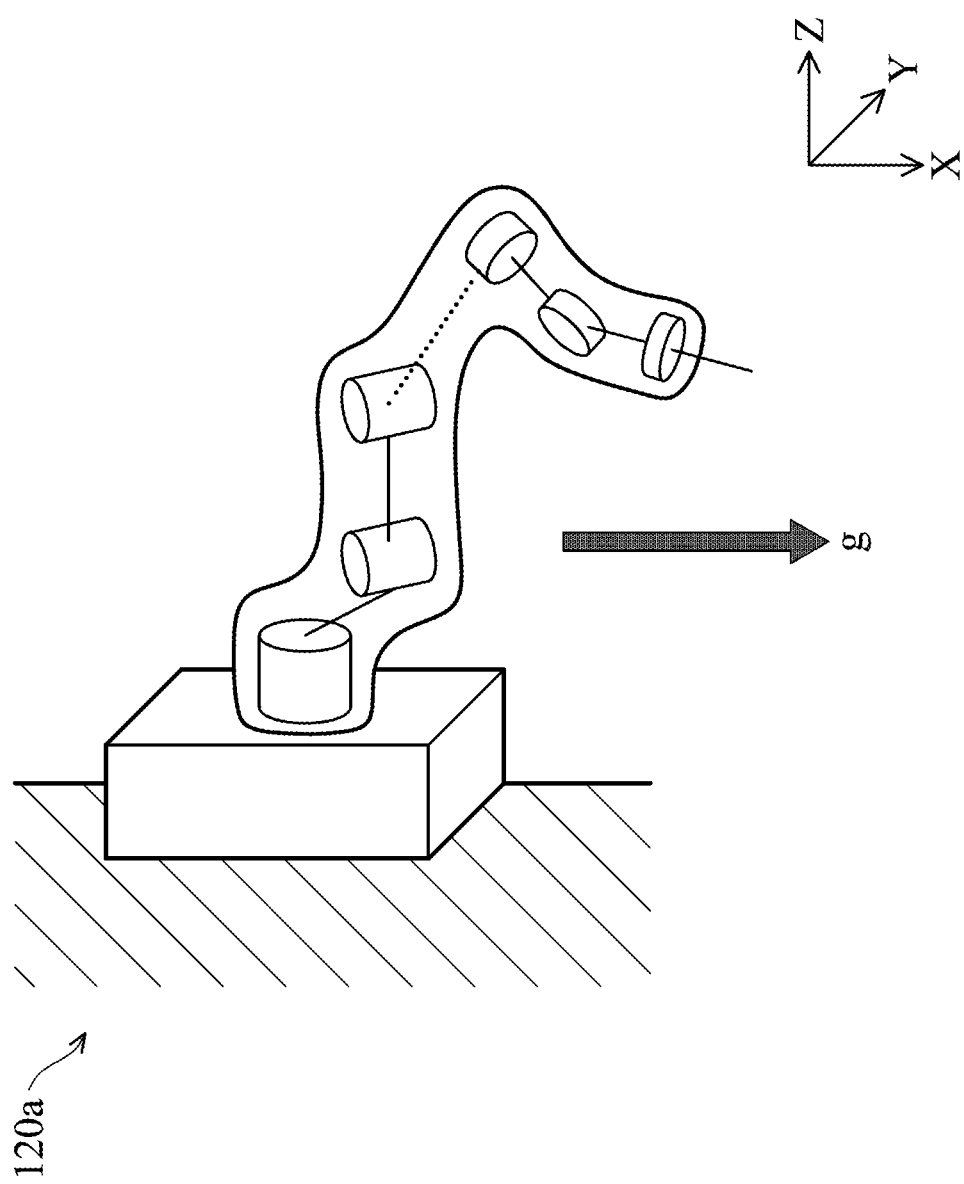

Furthermore, different mounting directions might also cause different stress variations on the robotic arm. For example, FIGS. 12A-12C are schematic diagrams of a different mounting direction corresponding to the robotic arm according to some embodiments of the present invention. As shown in FIG. 12A, when the robotic arm 120a is mounted on a platform parallel to the ground in an upright manner, gravity might have an impact in Z direction. On the contrary, when the robotic arm 120b is mounted on the platform parallel to the ground in a upside down manner shown in FIG. 12B, gravity might have the impact in the Z direction which is opposite to gravity shown in FIG. 12A. However, when the robotic arm 120c is mounted on the platform perpendicular to the ground, i.e. it is mounted in a side-mounted manner, gravity might have the impact in X direction. In other words, different mounted manners will make gravity have an impact in different directions; although other operating parameters, such as the payload and the workspace of the robotic arm, are unchanged, different sets of mechanism parametric deviations $\Delta S$ is still necessary for each mounting angles.

In addition, different payloads may also cause different stress variations. For example, when tool and/or load of work piece hanging on the robotic arm are changed, the payload will be changed accordingly. Therefore, when the robotic arms perform different operations with different payloads, even though the robotic arms is operated in the same positioning region, the processing unit 14 still have to use different sets of mechanism parametric deviations $\Delta S$ to calibrate the robotic arms.

In another situation, because the robotic arms made of different materials have different rigidities, that causes the amount of droop might be different even under the same payload condition, and different materials have different stress variation. For this reason, when the robotic arms are made of different materials, different sets of mechanism parametric deviations $\Delta S$ are also necessary.

Furthermore, when the temperature of the operating environment is changed, different sets of mechanism parametric deviations $\Delta S$ will be required in response to different thermal expansion effects, wherein the sets of mechanism parametric deviations $\Delta S$ corresponding to some specific temperatures can be obtained in advance, and then when the temperature of the operating environment changes, new sets of mechanism parametric deviations $\Delta S$ can be obtained by using interpolation or other methods based on the obtained sets of mechanism parametric deviations $\Delta S$. For example, different sets of mechanism parametric deviations $\Delta S$ for 0° C., 50° C. and 100° C. can be obtain in advance, and when the temperature of the operating environment is 25° C., a new set of mechanism parametric deviations $\Delta S$ can be obtained by using interpolation based on the sets of mechanism parametric deviations $\Delta S$ of 0° C. and 50° C.

Figure 13:
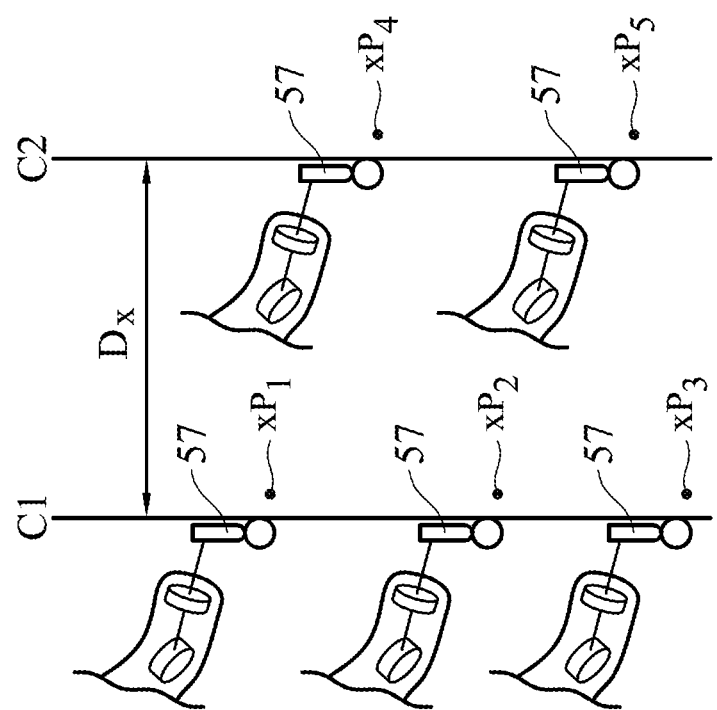
FIG. 13 illustrates how the robotic system 50 measures the first-direction displacement parameter Dx between the first precision plane C1 and the second precision plane C2 according to an embodiment of the present disclosure.

FIG. 13 illustrates how the robotic system 50 measures the first-direction displacement parameter Dx between the first precision plane C1 and the second precision plane C2 according to some embodiments of the present disclosure. Please refer to FIGS. 5, 6 and 13. In some embodiments, the measuring instrument 55 shown on FIG. 6 can be replaced by the measuring instrument 57 shown on FIG. 13. On FIG. 13, the measuring instrument 57 are directly positioned on the first and second precision planes C1~C2.

On FIG. 13, because the measuring instruments 57 are directly positioned on the first and second precision planes C1~C2, the first-direction measured displacements $xMx_k$, such as the first-direction measured displacements $xMx_1$, $xMx_2$, $xMx_3$, $xMx_4$, $xMx_5$ on FIG. 6, are not considered in the robotic arm system 50. Therefore, the first-direction measured relative-displacements $\Delta xMx_{i,j}$ are represented below:

$$\Delta xMx_{i,j} = Dx, i=1,2,3, j=4,5$$

Therefore, the optimization equation $\Phi$ is represented below:

$$\Phi_{rConfig} = \min_{\Delta S} \sum_{i=1}^{nx-1} \sum_{j=i+1}^{nx} (D_x - g_x(xS_i, xS_j, \Delta S(rConfig)))^2$$

$D_x$ is the first-direction displacement parameter, and $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, and $\Delta S$ is the set of mechanism parametric deviations related to a specific status of the robotic arm.

Wherein if the first-direction predictive positioning-points, such as $xP_1$~$xP_5$ on FIG. 13, are measured by the same precision plane (e.g. both measured by the first precision plane C1), then the value of Dx is 0. If the first-direction predictive positioning-points are measured by two parallel precision planes (e.g. measured by the first precision plane C1 and the second precision plane C2), then Dx is a first-direction relative displacement between the two parallel precision planes.

Please refer to FIG. 4 and FIG. 13. In some embodiments, the calibrating calculation unit 441 of the processing unit 44 calculates an optimization equation Φ of the robotic arm 41 according to the first-direction predictive relative-displacement equations $g_x(xS_i, xS_j, \Delta S)$ and the first-direction displacement parameter $D_x$ corresponding to the first-direction predictive positioning-points, such as $xP_1 \sim xP_5$ on FIG. 13, the second-direction predictive relative-displacement equation $g_y(yS_i, yS_j, \Delta S)$ and the second-direction displacement parameter $D_y$ corresponding to the second-direction predictive positioning-points, and the third-direction predictive relative-displacement equation $g_z(zS_i, zS_j, \Delta S)$ and the third-direction displacement parameter $D_z$ corresponding to the third-direction predictive positioning-points. The optimization equation Φ is represented below:

$$\Phi_{rConfig} = \min_{\Delta S} \left\{ \sum_{i=1}^{nx-1} \sum_{j=i+1}^{nx} (D_x - g_x(xS_i, xS_j, \Delta S(rConfig)))^2 + \sum_{i=1}^{ny-1} \sum_{j=i+1}^{ny} (D_y - g_y(yS_i, yS_j, \Delta S(rConfig)))^2 + \sum_{i=1}^{nz-1} \sum_{j=i+1}^{nz} (D_z - g_z(xS_i, xS_j, \Delta S(rConfig)))^2 \right\}$$

In another embodiment of the present disclosure, the robotic arm system 40 performs measurement and calculation in only two dimensions and obtains a corresponding optimization equation Φ. In this case, the calibrating calculation unit 441 of the processing unit 44 calculates an optimization equation Φ of the robotic arm 41 according to the first-direction predictive relative-displacement equations $g_x(xS_i, xS_j, \Delta S)$ and the first-direction displacement parameter $D_x$ corresponding to the first-direction predictive positioning-points, such as $xP_1 \sim xP_5$ on FIG. 13, and the second-direction predictive relative-displacement equation $g_y(yS_i, yS_j, \Delta S)$ and the second-direction displacement parameter $D_y$ corresponding to the second-direction predictive positioning-points. The optimization equation Φ is represented below:

$$\Phi = \min_{\Delta S} \left\{ \sum_{i=1}^{nx-1} \sum_{j=i+1}^{nx} (D_x - g_x(xS_i, xS_j, \Delta S))^2 + \sum_{i=1}^{ny-1} \sum_{j=i+1}^{ny} (D_y - g_y(yS_i, yS_j, \Delta S))^2 \right\}$$

Figure 14A:
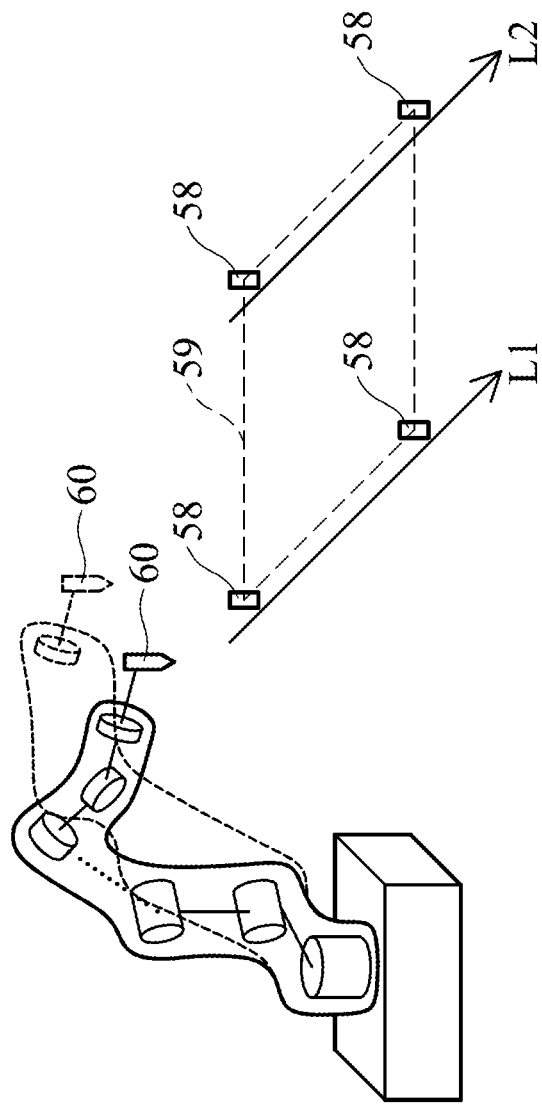
FIG. 14A is a calibration block 59 of a robotic arm system 51 according to some embodiment of the present disclosure.

FIG. 14A is a calibration block 59 of a robotic arm system 51 according to some embodiment of the present disclosure. Please refer to FIG. 5 and FIG. 14A. Each of the plurality of light beam detectors 58 emits a light beam to form a calibration block 59 having a first precision line L1 and a second precision line L2, and a mask 60 is positioned on an end of the robotic arm 51. The mask 60 on the end of the robotic arm is used to mask the first and second precision lines L1~L2 formed by the light beam detectors 58.

Figure 14B:
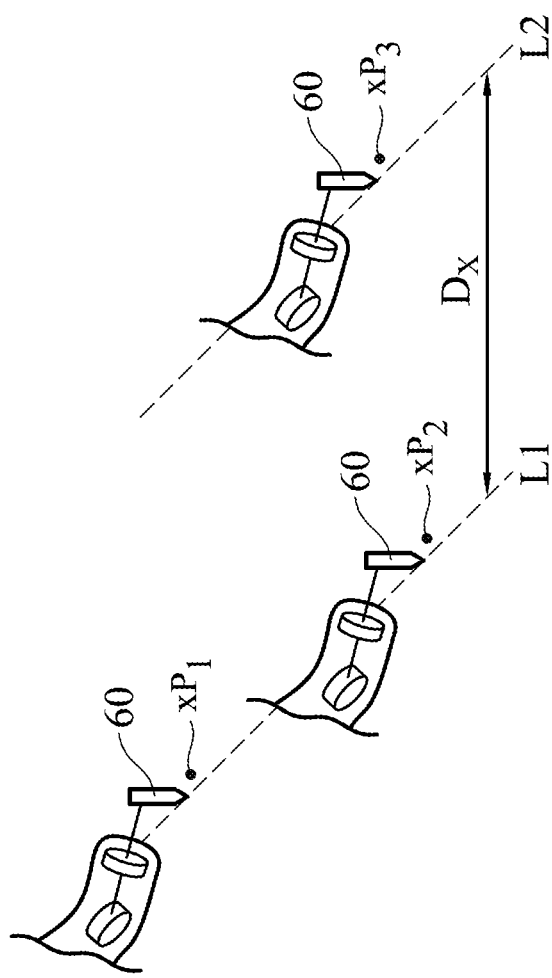
FIG. 14B illustrates how the robotic system 50 measures the first-direction displacement parameter Dx between the first precision plane C1 and the second precision plane C2 according to some embodiments of the present disclosure.

FIG. 14B illustrates how the robotic system 50 measures the first-direction displacement parameter Dx between the first precision line L1 and the second precision line L2 according to some embodiments of the present disclosure. Please refer to FIGS. 5, 6, 13, 14A and 14B. The robotic arm 51 performing nx actions such that the mask 60 on the end of the robotic arm 51 masks at the nx first-direction predictive positioning-points, such as $xP_1 \sim xP_3$ on FIG. 14B, wherein the first precision line L1 and the second precision line L2 are parallel.

Similar to FIG. 13, because the mask 60 masks light beam of the first and second precision lines L1~L2, the first-direction measured displacements $xMx_k$, such as the first-direction measured displacements $xMx_1$, $xMx_2$, $xMx_3$, $xMx_4$, $xMx_5$ on FIG. 6, are not considered in the robotic arm system 50. Therefore, in this case, the optimization equation Φ is represented below:

$$\Phi_{rConfig} = \min_{\Delta S} \sum_{i=1}^{nx-1} \sum_{j=i+1}^{nx} (D_x - g_x(xS_i, xS_j, \Delta S(rConfig)))^2$$

In conclusion, since the factors as described above will cause different stress variation or thermal expansion effects, the set of mechanism parametric deviations ΔS will change with different robot configurations and have corresponding values. For example, when robotic arm has $N_{HS}$ hand systems, $N_{PR}$ sets of positioning regions, $N_{MD}$ mounting directions, $N_{PL}$ payloads, and $N_{AT}$ ambient temperatures, the processing unit 14 may obtain the total number $N=N_{HS} \times N_{PR} \times N_{MD} \times N_{PL} \times N_{AT}$ sets of mechanism parametric deviations ΔS for each robot configurations. Wherein the factors as described can be selectively set by the users, and when the factors are not selected, the number corresponding to those factors are set to 1. For example, when a specific robotic arm set by the user has two sets of hand systems, three positioning regions and two sets of payloads, the total number of the sets of mechanism parametric deviations ΔS is 2×3×1×2×1=12.

It should be noted that the requirement of different sets of mechanism parametric deviations ΔS(rConfig) for the robotic arm can also be applied to any conventional calibration method of the robotic arm system, it is not limited to the method as described in the present invention.

While the present disclosure has been described by way of example and in terms of preferred embodiment, it is to be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A mechanism-parametric-calibration method for a robotic arm system, the robotic arm system comprising a robotic arm, a calibration block and a measuring instrument, wherein the mechanism-parametric-calibration method comprises:
    controlling, according to nx mechanism parameter sets corresponding to nx first-direction predictive positioning-points on a first precision plane and a second precision plane of the calibration block, the robotic arm performing nx actions such that an end of the robotic arm touches the nx first-direction predictive positioning-points, wherein the first precision plane and the second precision plane are perpendicular to a first direction, nx being an integer;
    sensing, using the measuring instrument, a first measured position of the first precision plane and a second measured position of the second precision plane when the end of the robotic arm touches the first measured position and the second measured position;

determining, according to the first measured position and the second measured position, a first-direction displacement parameter to decide a distance between the first precision plane and the second precision plane;

determining a first-direction predictive relative-displacement equation of each two of the nx first-direction predictive positioning-points;

obtaining, by the optimization equation, a set of mechanism parametric deviations of the robotic arm; and calibrating, by the set of mechanism parametric deviations, the nx mechanism parameter sets corresponding to the nx first-direction predictive positioning-points of the robotic arm.

2. The mechanism-parametric-calibration method as claimed in claim 1, wherein the optimization equation is $$\Phi_{rConfig} = \min_{\Delta S} \sum_{i=1}^{nx-1} \sum_{j=i+1}^{nx} (D_x - g_x(xS_i, xS_j, \Delta S(rConfig)))^2;$$

and wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, and $\Delta S$ is the set of mechanism parametric deviations related to a specific status of the robotic arm.

3. The mechanism-parametric-calibration method as claimed in claim 1, further comprising:

controlling, according to ny mechanism parameter sets corresponding to ny second-direction predictive positioning-points on a third precision plane and a fourth precision plane of the calibration block, the robotic arm performing ny actions so that the end of the robotic arm touches the ny second-direction predictive positioning-points, wherein the third and fourth precision planes are perpendicular to a second direction, ny being an integer;

sensing, using the measuring instrument, a third measured position of the third precision plane and a fourth measured position of the fourth precision plane when the end of the robotic arm touches the third and fourth measured positions;

determining, according to the third and fourth measured positions, a second-direction displacement parameter to decide a distance between the third precision plane and the fourth precision plane;

determining a second-direction predictive relative-displacement equation of each two of the ny second-direction predictive positioning-points; and deriving the optimization equation corresponding to the robotic arm from the first-direction predictive relative-displacement equations, the first-direction displacement parameter, the second-direction predictive relative-displacement equations and the second-direction displacement parameter.

4. The mechanism-parametric-calibration method as claimed in claim 3, wherein the optimization equation is $$\Phi_{rConfig} = \min_{\Delta S} \left\{ \sum_{i=1}^{nx-1} \sum_{j=i+1}^{nx} (D_x - g_x(xS_i, xS_j, \Delta S(rConfig)))^2 + \right.$$

-continued $$\left. \sum_{i=1}^{ny-1} \sum_{j=i+1}^{ny} (D_y - g_y(yS_i, yS_j, \Delta S(rConfig)))^2 \right\};$$

and wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, $D_y$ is the second-direction displacement parameter, $g_y(yS_i, yS_j, \Delta S(rConfig))$ is the second-direction predictive relative-displacement equation, $yS_i$ and $yS_j$ and are the mechanism parameter sets corresponding to the second-direction predictive positioning-points, and $\Delta S$ is the set of mechanism parametric deviations related to a specific status of the robotic arm.

5. The mechanism-parametric-calibration method as claimed in claim 3, further comprising:

controlling, according to ny mechanism parameter sets corresponding to ny second-direction predictive positioning-points on a third precision plane and a fourth precision plane of the calibration block, the robotic arm performing ny actions so the end of the robotic arm touches the ny second-direction predictive positioning-points, wherein the third precision plane and the fourth precision plane are perpendicular to a second direction;

controlling, according to nz mechanism parameter sets corresponding to nz third-direction predictive positioning-points on a fifth precision plane and a sixth precision plane, the robotic arm performing nz actions so the end of the robotic arm touches the nz third-direction predictive positioning-points, wherein the fifth precision plane and the sixth precision plane are perpendicular to a third direction, nz being an integer;

sensing, using the measuring instrument, a third measured position of the third precision plane and a fourth measured position of the fourth precision plane when the end of the robotic arm touches the third and fourth measured positions;

determining, according to the third and fourth measured position, a second-direction displacement parameter to decide a distance between the third precision plane and the fourth precision plane;

sensing, using the measuring instrument, a fifth measured position of the fifth precision plane and a sixth measured position of the sixth precision plane when the end of the robotic arm touches the fifth and sixth measured positions;

determining, according to the fifth measured position and the sixth measured position, a third-direction displacement parameter to decide a distance between the fifth precision plane and the sixth precision plane;

determining a second-direction predictive relative-displacement equation of each two of the ny second-direction predictive positioning-points and determining a third-direction predictive relative-displacement equation of each two of the nz third-direction predictive positioning-points; and deriving the optimization equation corresponding to the robotic arm from the first-direction predictive relative-displacement equations, the first-direction displacement parameter, the second-direction predictive relative-displacement equations, the second-direction displacement parameter, the third-direction predictive relative-displacement equations and the third-direction displacement parameter.

6. The mechanism-parametric-calibration method as claimed in claim 5, wherein the optimization equation is:

$$\Phi_{rConfig} = \min_{\Delta S}\left\{\sum_{i=1}^{nx-1}\sum_{j=i+1}^{nx}(D_x - g_x(xS_i, xS_j, \Delta S(rConfig)))^2 + \sum_{i=1}^{ny-1}\sum_{j=i+1}^{ny}(D_y - g_y(yS_i, yS_j, \Delta S(rConfig)))^2 + \sum_{i=1}^{nz-1}\sum_{j=i+1}^{nz}(D_z - g_z(zS_i, yS_j, \Delta S(rConfig)))^2\right\};$$

and
wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, $D_y$ is the second-direction displacement parameter, $g_y(yS_i, yS_j, \Delta S(rConfig))$ is the second-direction predictive relative-displacement equation, and $yS_i$ and $yS_j$ are the mechanism parameter sets corresponding to the second-direction predictive positioning-points, $D_z$ is the third-direction displacement parameter, $g_z(zS_i, zS_j, \Delta S(rConfig))$ is the third-direction predictive relative-displacement equation, $zS_i$ and $zS_j$ are the mechanism parameter sets corresponding to the third-direction predictive positioning-points, and $\Delta S$ is the set of mechanism parametric deviations related to a specific status of the robotic arm.

7. The mechanism-parametric-calibration method as claimed in claim 1, wherein the measuring instrument comprises a measuring instrument used for sensing one-dimensional displacements, a measuring instrument used for sensing two-dimensional displacements, or a measuring instrument used for sensing three-dimensional displacements.

8. A robotic arm system, comprising a robotic arm, a calibration block and a measuring instrument, wherein the robotic arm system is configured to perform:
controlling, according to nx mechanism parameter sets corresponding to nx first-direction predictive positioning-points on a first precision plane and a second precision plane of the calibration block, the robotic arm performing nx actions such that an end of the robotic arm touches the nx first-direction predictive positioning-points, wherein the first precision plane and the second precision plane are perpendicular to a first direction, nx being an integer;
sensing, using the measuring instrument, a first measured position of the first precision plane and a second measured position of the second precision plane when the end of the robotic arm touches the first measured position and the second measured position;
determining, according to the first measured position and the second measured position, a first-direction displacement parameter to decide a distance between the first precision plane and the second precision plane;
determining a first-direction predictive relative-displacement equation of each two of the nx first-direction predictive positioning-points;

deriving an optimization equation corresponding to the robotic arm from the first-direction predictive relative-displacement equations and the first-direction displacement parameter;
obtaining, by the optimization equation, a set of mechanism parametric deviations of the robotic arm; and
calibrating, by the set of mechanism parametric deviations, the nx mechanism parameter sets corresponding to the nx first-direction predictive positioning-points of the robotic arm.

9. The robotic arm system as claimed in claim 1, wherein the optimization equation is $$\Phi_{rConfig} = \min_{\Delta S}\sum_{i=1}^{nx-1}\sum_{j=i+1}^{nx}(D_x - g_x(xS_i, xS_j, \Delta S(rConfig)))^2;$$

and
wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, and $\Delta S$ is the set of mechanism parametric deviations related to a specific status of the robotic arm.

10. The robotic arm system as claimed in claim 1, wherein the robotic arm system is further performed:
controlling, according to ny mechanism parameter sets corresponding to ny second-direction predictive positioning-points on a third precision plane and a fourth precision plane of the calibration block, the robotic arm performing ny actions so that the end of the robotic arm touches the ny second-direction predictive positioning-points, wherein the third and fourth precision planes are perpendicular to a second direction, ny being an integer;
sensing, using the measuring instrument, a third measured position of the third precision plane and a fourth measured position of the fourth precision plane when the end of the robotic arm touches the third and fourth measured positions;
determining, according to the third and fourth measured position, a second-direction displacement parameter to decide a distance between the third precision plane and the fourth precision plane;
determining a second-direction predictive relative-displacement equation of each two of the ny second-direction predictive positioning-points; and
deriving the optimization equation corresponding to the robotic arm from the first-direction predictive relative-displacement equations, the first-direction displacement parameter, the second-direction predictive relative-displacement equations and the second-direction displacement parameter.

11. The robotic arm system as claimed in claim 10, wherein the optimization equation is $$\Phi_{rConfig} = \min_{\Delta S}\left\{\sum_{i=1}^{nx-1}\sum_{j=i+1}^{nx}(D_x - g_x(xS_i, xS_j, \Delta S(rConfig)))^2 + \sum_{i=1}^{ny-1}\sum_{j=i+1}^{ny}(D_y - g_y(yS_i, yS_j, \Delta S(rConfig)))^2\right\};$$

and
wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, $D_y$ is the second-direction displacement parameter, $g_y(yS_i, yS_j, \Delta S(rConfig))$ is the second-direction predictive relative-displacement equation, $yS_i$ and $yS_j$ are the mechanism parameter sets corresponding to the second-direction predictive positioning-points, and $\Delta S$ is the set of mechanism parametric deviations related to a specific status of the robotic arm.

12. The robotic arm system as claimed in claim 1, the robotic arm system is further performed:
controlling, according to ny mechanism parameter sets corresponding to ny second-direction predictive positioning-points on a third precision plane and a fourth precision plane of the calibration block, the robotic arm performing ny actions so the end of the robotic arm touches the ny second-direction predictive positioning-points, wherein the third precision plane and the fourth precision plane are perpendicular to a second direction;
controlling, according to nz mechanism parameter sets corresponding to nz third-direction predictive positioning-points on a fifth precision plane and a sixth precision plane, the robotic arm performing nz actions so the end of the robotic arm touches the nz third-direction predictive positioning-points, wherein the fifth precision plane and the sixth precision plane are perpendicular to a third direction, nz being an integer;
sensing, using the measuring instrument, a third measured position of the third precision plane and a fourth measured position of the fourth precision plane when the end of the robotic arm touches the third and fourth measured positions;
determining, according to the third and fourth measured position, a second-direction displacement parameter to decide a distance between the third precision plane and the fourth precision plane;
sensing, using the measuring instrument, a fifth measured position of the fifth precision plane and a sixth measured position of the sixth precision plane when the end of the robotic arm touches the fifth and sixth measured positions;
determining, according to the fifth measured position and the sixth measured position, a third-direction displacement parameter to decide a distance between the fifth precision plane and the sixth precision plane;
determining a second-direction predictive relative-displacement equation of each two of the ny second-direction predictive positioning-points and determining a third-direction predictive relative-displacement equation of each two of the nz third-direction predictive positioning-points; and
deriving the optimization equation corresponding to the robotic arm from the first-direction predictive relative-displacement equations, the first-direction displacement parameter, the second-direction predictive relative-displacement equations, the second-direction displacement parameter, the third-direction predictive relative-displacement equations and the third-direction displacement parameter.

13. The robotic arm system as claimed in claim 12, wherein the optimization equation is $$\Phi_{rConfig} = \min_{\Delta S}\left\{\sum_{i=1}^{nx-1}\sum_{j=i+1}^{nx}(D_x - g_x(xS_i, xS_j, \Delta S(rConfig)))^2 + \sum_{i=1}^{ny-1}\sum_{j=i+1}^{ny}(D_y - g_y(yS_i, yS_j, \Delta S(rConfig)))^2 + \sum_{i=1}^{nz-1}\sum_{j=i+1}^{nz}(D_z - g_z(zS_i, yS_j, \Delta S(rConfig)))^2\right\};$$

and
wherein $D_x$ is the first-direction displacement parameter, $g_x(xS_i, xS_j, \Delta S(rConfig))$ is the first-direction predictive relative-displacement equation, $xS_i$ and $xS_j$ are the mechanism parameter sets corresponding to the first-direction predictive positioning-points, $D_y$ is the second-direction displacement parameter, $g_y(yS_i, yS_j, \Delta S(rConfig))$ is the second-direction predictive relative-displacement equation, $yS_i$ and $yS_j$ are the mechanism parameter sets corresponding to the second-direction predictive positioning-points, $D_z$ the third-direction displacement parameter, $g_z(zS_i, zS_j, \Delta S(rConfig))$ is the third-direction predictive relative-displacement equation, $zS_i$ and $zS_j$ are the mechanism parameter sets corresponding to the third-direction predictive positioning-points, and $\Delta S$ is the set of mechanism parametric deviations related to a specific status of the robotic arm.

14. The robotic arm system as claimed in claim 1, wherein the measuring instrument comprises a measuring instrument used for sensing one-dimensional displacements, a measuring instrument used for sensing two-dimensional displacements, or a measuring instrument used for sensing three-dimensional displacements.

15. A robotic arm system, comprising a robotic arm and a plurality of light beam detectors, wherein each of the plurality of light beam detectors emits a light beam to form a calibration block having a first precision line and a second precision line, and a mask is positioned on an end of the robotic arm, wherein the robotic arm system is configured to perform:
controlling, according to nx mechanism parameter sets corresponding to nx first-direction predictive positioning-points on the first precision line and the second precision line, the robotic arm performing nx actions such that the mask on the end of the robotic arm masks at the nx first-direction predictive positioning-points, wherein the first precision line and the second precision line are perpendicular to a first direction, nx being an integer;
sensing, using the plurality of light beam detectors, a first measured position of the first precision line and a second measured position of the second precision line when the end of the robotic arm touches the first measured position and the second measured position;
determining, according to the first measured position and the second measured position, a first-direction displacement parameter to decide a distance between the first precision line and the second precision line;
determining a first-direction predictive relative-displacement equation of each two of the nx first-direction predictive positioning-points;
deriving an optimization equation corresponding to the robotic arm from the first-direction predictive relative-displacement equations and the first-direction displacement parameter;

obtaining, by the optimization equation, a set of mechanism parametric deviations of the robotic arm; and calibrating, by the set of mechanism parametric deviations, the nx mechanism parameter sets corresponding to the nx first-direction predictive positioning-points of the robotic arm.

\* \* \* \* \*